United States Patent [19]

Clement

[11] Patent Number: 5,726,668
[45] Date of Patent: Mar. 10, 1998

[54] PROGRAMMABLE GRAPHICS PANEL

[75] Inventor: John L. Clement, Midland, Mich.

[73] Assignee: The Dow Chemical Company, Midland, Mich.

[21] Appl. No.: 328,600

[22] Filed: Oct. 25, 1994

Related U.S. Application Data

[63] Continuation of Ser. No. 985,796, Nov. 30, 1992, abandoned.

[51] Int. Cl.$^6$ .................................................. G09G 5/00
[52] U.S. Cl. ........................... 345/1; 345/2; 345/73; 340/825.06; 364/146; 364/188
[58] Field of Search .................... 345/1, 2, 59, 46, 345/73, 82, 44, 156, 173, 117; 340/825.06, 825.17, 825.21, 815.51, 641, 642, 524, 525; 364/187, 188, 120, 146, 550, 551.01; 395/153, 200.06

[56] References Cited

U.S. PATENT DOCUMENTS

| | | |
|---|---|---|
| 1,089,798 | 3/1914 | Smith . |
| 1,108,989 | 9/1914 | Henry . |
| 1,118,597 | 11/1914 | Taggart et al. . |
| 2,340,559 | 2/1944 | Pruyn et al. . |
| 3,587,048 | 6/1971 | Brown, Jr. ............... 340/825.21 |
| 3,643,222 | 2/1972 | Kimura ..................... 340/825.17 |
| 3,719,937 | 3/1973 | Doyle ............................ 345/117 |
| 3,754,244 | 8/1973 | Garrett ..................... 340/815.51 |
| 3,909,822 | 9/1975 | Lee et al. ........................ 345/73 |
| 4,001,807 | 1/1977 | Dallimonti ........................ 345/1 |
| 4,024,531 | 5/1977 | Ashby ............................. 345/59 |
| 4,074,242 | 2/1978 | Mayer ............................ 340/524 |
| 4,125,830 | 11/1978 | Cochran et al. ................. 345/46 |
| 4,200,226 | 4/1980 | Piras ............................. 364/187 |
| 4,262,338 | 4/1981 | Gaudio, Jr. ................... 395/153 |
| 4,297,692 | 10/1981 | Maier ............................. 345/44 |
| 4,303,973 | 12/1981 | Williamson, Jr. et al. ..... 340/722 |
| 4,357,671 | 11/1982 | Miller ............................ 345/56 |
| 4,370,733 | 1/1983 | Gaudio ............................ 345/73 |
| 4,396,977 | 8/1983 | Slater et al. .................. 345/173 |
| 4,471,348 | 9/1984 | London et al. ................ 340/722 |
| 4,509,117 | 4/1985 | Korowitz .................. 395/200.06 |
| 4,527,270 | 7/1985 | Sweeton .......................... 371/11 |
| 4,663,704 | 5/1987 | Jones et al. ................... 364/180 |
| 4,679,135 | 7/1987 | Kobayashi et al. ........... 364/188 |
| 4,704,676 | 11/1987 | Flanagan et al. .............. 395/906 |
| 4,718,025 | 1/1988 | Minor et al. .................. 364/550 |
| 4,750,150 | 6/1988 | Weppler ........................ 395/275 |
| 4,771,278 | 9/1988 | Pooley .......................... 340/780 |
| 4,808,975 | 2/1989 | Hochhaus et al. ............ 340/641 |
| 4,820,956 | 4/1989 | Slobodzian et al. ............. 345/73 |
| 4,823,254 | 4/1989 | Takada et al. ................. 364/188 |
| 4,933,885 | 6/1990 | Kato et al. ................. 364/551.01 |
| 4,942,514 | 7/1990 | Miyagaki et al. ............. 345/173 |
| 5,028,915 | 7/1991 | Yang .............................. 345/82 |
| 5,075,672 | 12/1991 | Stefana ......................... 340/641 |
| 5,202,822 | 4/1993 | McLaughlin et al. ......... 364/187 |

Primary Examiner—Steven Saras
Attorney, Agent, or Firm—Brooks & Kushman

[57] ABSTRACT

A graphics display system including one or more display panels having a plurality of lights, a graphics panel data processor including at least one microprocessor, logic for establishing a correspondence between the process variables and selected lights, logic for determining the current state of each of the process variables and transmitting a signal to the corresponding light(s) on the panel to activate the light depending on the current state of the corresponding process variable, and communication means for rapid periodic communication of the process variable data from a process control computer utilizing the graphics display system to each of the panels in the system.

7 Claims, 18 Drawing Sheets

B = BULB ON
C = BULB OFF

B = BULB ON
C = BULB OFF

PROGRAMMABLE GRAPHICS PANEL

This is a continuation of application Ser. No. 07/985,796 filed on Nov. 30, 1992 now abandoned.

TECHNICAL FIELD

The present invention relates to manufacturing process control systems and, in particular, to a programmable graphics display system for conveying process control information to an operator.

BACKGROUND

As supervision and operation of large, complex manufacturing processes and, in particular, chemical manufacturing processes, has become increasingly centralized and comprehensive, process control engineers are faced with the increasing challenge of conveying vast amounts of process control information in real-time to the human operators. With the advancing state of electronic automation, entire plants and/or related manufacturing processes in different plants may be controlled by a single process control system employing a single control room from which one or more operators supervises and, when necessary, intercedes in controlling the manufacturing process. A critical element of the human control function is the rapid, real-time conveyance of massive amounts of selected process information to the operator, to allow the operator to constantly survey the operation, quickly determine where problems or inefficiencies exist and, where necessary, taking appropriate action to correct the problem.

It is well-known to utilize graphics displays which provide process control information at varying levels of specificity, ranging from the current values of analog and digital inputs and outputs associated with the equipment and instruments on the plant floor, to selected process control system variables, to graphic symbols depicting the current status of a predefined subset of the process based upon analysis of selected process variables. This information is typically conveyed to the operator on CRT screens and/or through the use of panels of one or more lights.

It is well known in other technical fields to utilize large panels consisting of an array of lights to communicate information about an event. U.S. Pat. Nos. 1,089,798, 1,108,989, 1,118,597, and 2,340,559 all illustrate examples of electrically illuminated boards or signs. And, as mentioned above, it is also well-known to utilize light boards or panels to convey manufacturing process information to operators.

One object of the present invention is to provide a programmable graphic display for use with a manufacturing process control system, wherein the graphic display includes at least one display panel and a graphics panel data processor capable of driving the display, thereby reducing the graphics processing load on the manufacturing process control system's computer.

Another object of the present invention is to provide a programmable graphics display system including at least one display panel having a fully populated grid of lights, and a graphics panel data processor associated with each panel capable of receiving processed variable data from a manufacturing process control system, and wherein each graphic panel data processor includes logic for establishing a correspondence between any variable of the manufacturing process control system and any one or more of the lights on the panel.

Another object of the present invention is to provide a programmable graphic display system including one or more display panels each having a plurality of lights and a graphics panel data processor, wherein the graphics panel data processors include logic for establishing a correspondence between any manufacturing process variable and one or more lights on one or more of the panels.

Another object of the present invention is to provide a programmable graphic display system including a plurality of display panels each having a plurality of lights and a graphics panel data processor, and wherein the graphics panel data processor includes logic for establishing a correspondence between any of the variables in the manufacturing process control system and one or more lights on its panel.

Another object of the present invention is to provide a programmable graphics panel system which allows for reassignment of the position of a light associated with a particular manufacturing process variable anywhere on the panel grid without the need for physically unplugging the bulb, removing it from its current position, and plugging it in to its new position.

Another object of the present invention is to provide a programmable graphics display system wherein the graphics panel data processor associated with each of the display panels includes logic for automatically interrogating each of the plurality of lights on the panel to determine which bulbs, if any, have burned out, and thereafter indicating the location of any burned-out bulb to the operator.

Another object of the present invention is to provide a programmable graphics display system for a process control system including a plurality of graphics display panels, a serial data communications ring interconnecting each of the graphics display panels and the process control system for rapid, periodic communication of the current state of process control variables from the PCS to each of the graphics display panels.

Another object of the present invention is to provide a programmable graphics display system including one or more display panels and serial data communication means interconnecting the display panels and the manufacturing process control system, wherein the serial communication means is provided with a redundant architecture to reduce the chance of communication interruptions in the system.

Another object of the present invention is to provide a programmable graphics display system for a manufacturing process control system having redundant, independent process control computers, wherein the programmable graphics display system includes at least one display panel having a graphics panel data processor, and wherein the data processor also has redundant, independent computers.

Another object of the present invention is to provide a programmable graphics display system including at least one display panel having a plurality of lights, and a graphics panel data processor associated with each panel and capable of receiving process variable data from a manufacturing process control system, and wherein each graphic panel data processor includes logic for establishing a correspondence between the process variable data and the lights on the panel, and logic for determining, for each light on the panel, the current state of the corresponding process variable and transmitting a signal to the corresponding light on the panel to activate or deactivate the light depending on the current state of the corresponding process variable.

DISCLOSURE OF INVENTION

In carrying out the above and other objects, the programmable graphics display system of the present invention includes one or more display panels having a plurality of lights, a graphics panel data processor including at least one microprocessor, logic for establishing a correspondence between the process variables and selected lights, and logic for determining the current state of each of the process variables and transmitting a signal to the corresponding light (or lights) on the panel to activate or deactivate the light depending on the current state of the corresponding process variable, and communication means for rapid, periodic communication of the process variable data from the PCS to each of the panels in the system.

The graphics display panel of the present invention also preferably includes data input means for establishing the correspondence between a selected process variable and one or more selected lights on that panel.

The communication means is preferably serial and comprises a primary communication path connecting one or more of the display panels in the system and the PCS in series, forming a ring about which the process variable data is communicated in a first direction, and a secondary communication path also interconnecting the graphics display panels and the PCS in series in a second ring which communicates the identical process variable data in the second direction which is opposite the first direction. This redundant data communication ring insures that all components of the system are likely to receive the data transmitted from the PCS in the event of an interruption in one or both of the primary and secondary communication paths.

These objects, features, and advantages of the present invention are readily apparent from the following detailed description of the best mode and alternative embodiments for carrying out the invention when taken in connection with the accompanying drawings.

BEST MODE FOR CARRYING OUT THE INVENTION

Figure 1:
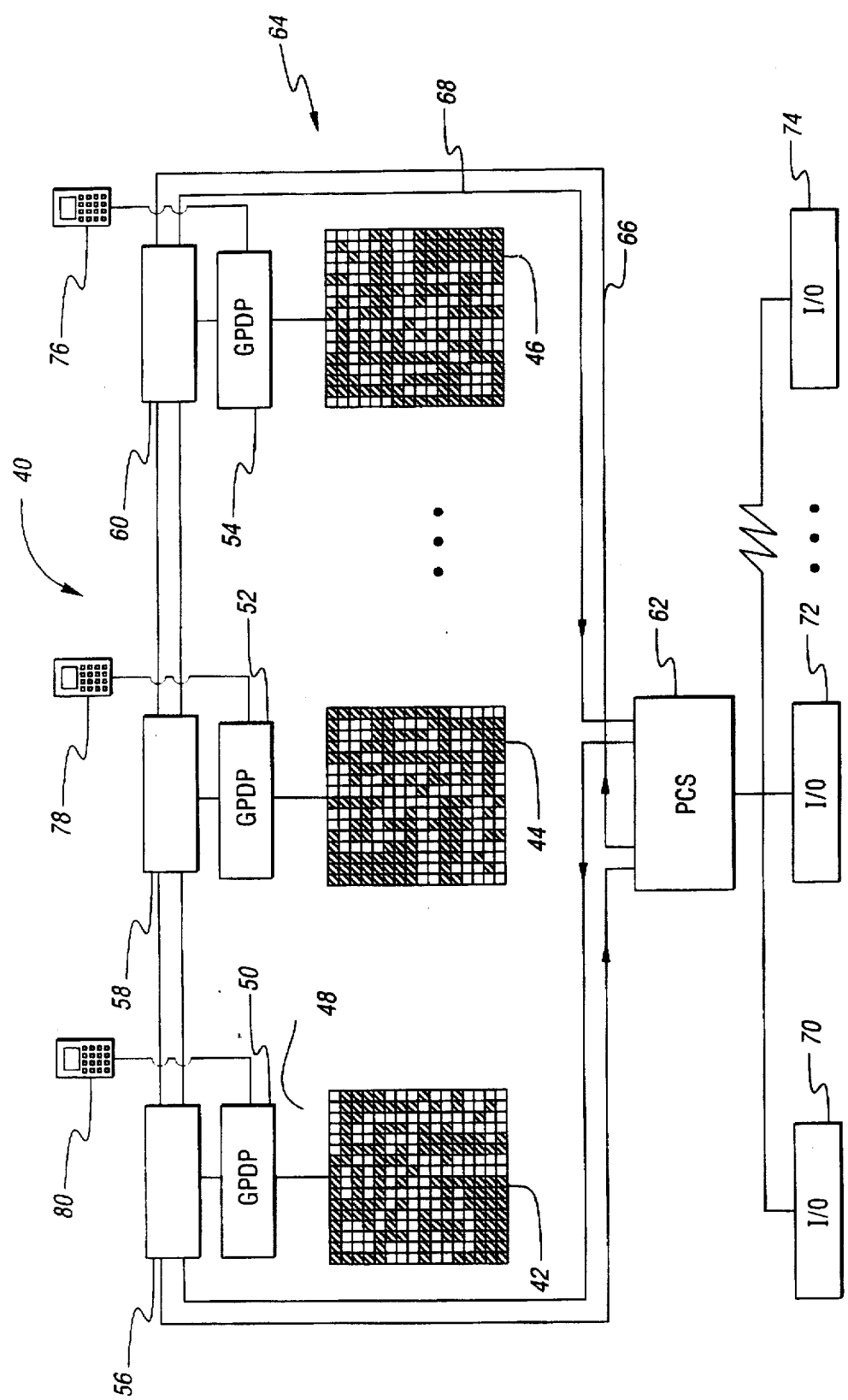
FIG. 1 is a schematic representation of the programmable graphic display system of the present invention.

Referring to FIG. 1, the programmable graphics display system 40 of the present invention includes at least one display panel 42, 44, 46 including a plurality of lights (or bulbs) 48, a graphic panel data processor (GPDP) 50, 52, 54 associated with each panel 42, 44, 46 and high-speed communication means capable of receiving data from a manufacturing process control system (PCS) 62. The communication means preferably includes a data communication ring 64 comprising a primary communications path 66 which interconnects each of the display panels 42, 44, 46 (via panel communication devices 56, 58, 60 and their associated GPDPs 50, 52, 54) and the PCS 62 to transmit process variable data in a first direction through the system 40, and a secondary communications path 68 which is similarly interconnected to transmit process variable data in the opposite direction through the system 40. Each of the primary path 66 and the secondary path 68 are preferably constructed of either glass or plastic fibers through which system data may be optically transmitted at approximately one megabaud per second. As will be appreciated by those skilled in the art, the choice of plastic or glass fibers is dictated in large part by the overall distance between the display panels 42, 44, 46 and/or the PCS 62.

It will be appreciated by those skilled in the art that, though the preferred embodiment employs a serial data communication ring 64, other high-speed communication rings may be devised employing, for example, combined serial and parallel architecture, to provide high-speed communication between display panels and the process control system, without departing from the spirit of the present invention.

The process variable data may consist of digital inputs (DIs), digital outputs (DOs), analog inputs (AIs), or analog outputs (AOs) utilized by the process control system 62 and interconnected through one or more data I/O interfaces 70, 72, 74 to the manufacturing process equipment and instruments on the plant floor. The process variables may also include variables defined and/or utilized by the PCS 62, such as alarms (ALs) or status variables which may relate to the physical status of the process control (DSs) or the status of the graphic display system (GSs).

The system 40 of the present invention also typically includes at least one data input device, such as keypads 76, 78, 80 from which the correspondence between the bulb locations on each panel and selected process variables can be input to the GPDP for each panel 46, 44, 42, and for executing system diagnostics. It will be appreciated by those skilled in the art that, while a twenty button detachable keypad (available from Grayhill, Inc., of La Grange, Ill.) with a sixteen character x two line liquid crystal display (LCD) (available from Hitachi, Ltd.) is employed as the data input device for each of the panels 42, 44, 46 in the preferred embodiment, any of a variety of data input devices may be utilized, including data input means which download the bulb/variable correspondence data from another computer, such as the PCS 62, or by encoding the Processor Board's memory (EEPROM) directly with bulb/variable correspondence data with a conventional CAD system.

A power supply, preferably 28 volt DC input, 5 volts, 60 amps DC output, is also mounted to provide power to each panel 42, 44, 46.

Each of the display panels 42, 44, 46 is similarly configured and interconnected to the data communications ring 64 to receive serial data from the PCS 62. In the preferred embodiment, up to 32 panels can be used in a series, though 3 panels (with their associated GPDPs, panel communications devices 56, 58, 60, and keypads) are shown for illustration purposes in FIGS. 1 and 2.

Figure 2:
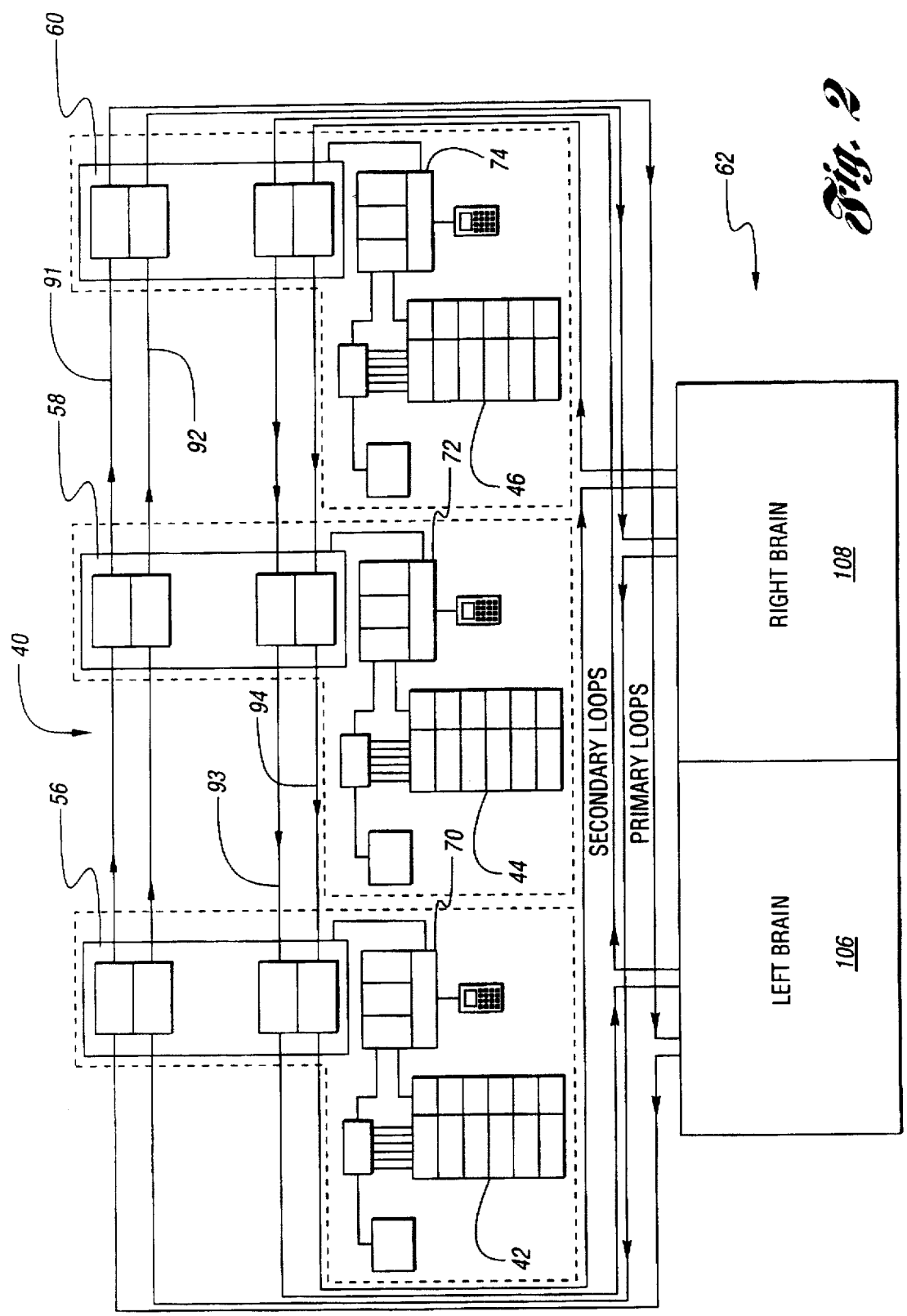
FIG. 2 is a schematic showing the hardware components of a graphic display system of the present invention.
Figure 3:
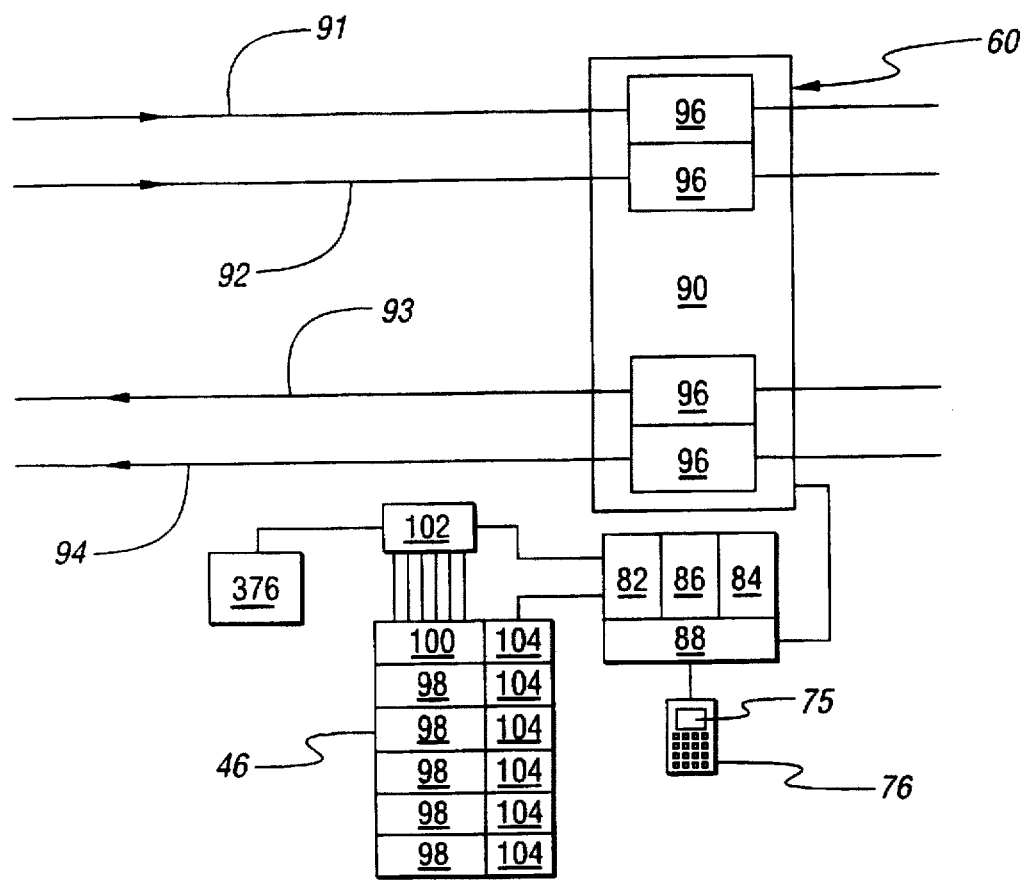
FIG. 3 is an enlarged schematic of one of the display panels shown in FIG. 2.

As illustrated in FIGS. 2 and 3, the preferred embodiment is designed to support a PCS 62 having a redundant computer architecture. That is, the Process Control System 62 includes two substantially identical computer control systems which acquire and analyze manufacturing process data simultaneously and independently. This redundant architecture provides a valuable measure of security where, as in real-time control of a chemical processing plant, interruption in operation of the process control computer could present problems which are difficult to avoid by human intervention. Thus, where the PCS 62 supported by the Graphic Display System 40 of the present invention is itself a redundant control, the programmable graphics display system of the present invention also preferably employs redundant processing in the form of two Processor Boards 82 and 84. It should be noted that, though the redundancy in the preferred embodiment is achieved by utilizing two Processor Boards 82 and 84, the system of the present invention can be constructed with additional processors to support a redundant process control system which employs a greater level of redundancy (i.e., more than two independent computer control systems) without departing from the spirit of the present invention.

Referring again to FIGS. 2 and 3, the hardware components of each of the display panels 42, 44, 46 are illustrated in greater detail in the preferred embodiment of the system 40, which is, as previously described, adapted to interconnect to a PCS 62 having a redundant computer architecture, wherein both processors are preferably active in reading inputs from the field and transmitting outputs to the field during operation. In the preferred embodiment, each of the display panels 42, 44, 46 in the system 40 of the present invention is, with the exception of the variable-to-bulb correspondence, substantially identical in its hardware and software components. For clarity, the following description will focus on one of the panels 46 and its associated hardware (shown within the dotted boundaries of FIG. 2 and isolated in FIG. 3).

The GPDP on each panel includes a pair of Processor Boards 82, 84 for receiving all incoming process data, processing the data, and operating the bulbs on the panel 46, a Memory Backup Board 86 for storing the process variable data for backup access by the Process Boards 82 and 84, a Backplane Board 88 interconnecting the Processor Boards 82 and 84 and Memory Backup Board 86 to the Fiber Mount Board 90 (hereinafter described).

The panel communication devices 56, 58, 60 on each panel also preferably includes a Fiber Mount Board 90 which connects the dual primary communication paths 91, 92 and the dual secondary communication paths 93, 94 to the Backplane Board 88, and a Fiber Driver Board 96 for each of the communication paths 91, 92, 93, 94 which converts electrical signals to optical signals to transmit them through the optical fiber network and, conversely, converts the received optical signals to electrical signals for communication by the Fiber Mount Board 90 to the Backplane Board 88.

Each panel also preferably includes a plurality of lightbulbs 48 (not shown) connected to a plurality of Bulb Driver Boards 98 and/or 100. Bulb Driver Board 98 contains the mechanical mounting means for mounting eight rows by thirty columns of lightbulbs as well as the interconnections to the Power Distribution Board 102 and the Decoder Board 104 associated with the Bulb Driver Board. Bulb Driver Board 100 contains the mechanical mounting means for mounting eleven rows by thirty columns of light bulbs. The preferred embodiment employs five 8×30 driver boards 98 and one 11×30 driver board 100 in each panel, for a total of 1530 bulbs per panel. Each Decoder Board 104 decodes bulb information sent from the Processor Boards 82 and 84 and sends the appropriate signal to the appropriate location to control the bulbs on its associated bulb driver board 98 or 100.

Each display panel also preferably includes a Power Distribution Board 102 which distributes and limits the current to each of the boards of the panel 46.

In the preferred embodiment, each of the Processor Boards 82 and 84 independently process incoming process control data received from one of the left brain 106 and right brain 108, respectively, of the PCS 62, and each independently prepares bulb control data for transmission to the Decoder Boards 104 on the panel. Thus, Processor Board 82 processes data received from one of the PCS computers 106 via, for example, primary serial communication path 91 and secondary serial communication path 93, while Processor Board 84 receives data (theoretically identical) from the second PCS computer 108 via another, independent primary serial communication path 92 and another independent secondary serial communication path 94. In the preferred embodiment, each of the Processor Boards 82, 84 periodically communicate serially with each other, preferably every one sixteenth (1/16) of a second, to confirm that the other Processor Board is active. Provided that both boards are active, the bulb control data transmission is accomplished by one of the boards, 82 or 84. In the preferred embodiment, control over transmission of the bulb data to the Decoder Boards 104 is switched between Processor Boards 82 and 84 on a timed basis, preferably at four second intervals. As will be appreciated by those skilled in the art, if desired, additional redundancy in the operation of the Graphic Display System 40 could be programmed into the Processor Boards 82, 84. Also, other arbitration schemes may be employed to determine when or under which circumstances which one of the Processor Boards 82 or 84 transmits the data to the Decoder Boards 104.

It will also be appreciated by those skilled in the art that the Programmable Graphic Display System 40 of the present invention could be constructed with graphic panel data processors 50, 52, 54 each having a single Processor Board without departing from the spirit of the invention. And, as will also be appreciated by those skilled in the art, the Data Communication Ring 64 could comprise a single pair of data paths, such as a primary path 66 and a secondary path 68 (shown in FIG. 1) for communication with a non-redundant process control computer, again without departing from the spirit of the present invention.

The system 40 of the present invention could also be constructed to accommodate a triple redundant process control computer. In a triple redundant architecture, the GPDPs 50, 52, 54 would employ three processor boards, and data communication ring 64 could comprise three pairs of data paths to simultaneously and independently receive process variable data from each of the three brains in the triple redundant process control computer. A revised arbitration scheme would then be employed to determine which of the three processor boards transmitted bulb data to the Decoder Boards 104. However, the preferred embodiment, which supports a redundant PCS architecture, employs serial communications means including a redundant data communication ring 64 (including two independent primary serial communication paths 91 and 92 and two independent secondary serial communication paths 93 and 94) and redundant Processor Boards 82 and 84 to accommodate and independently process the redundant data transmission from each of the left brain 106 and the right brain 108 of the PCS 62.

In the preferred embodiment, the software logic employed by the GPDP is programmed in PLM, available from Intel, to perform the functions hereinafter described.

Each of FIGS. 4–15 display a flowchart of a portion of the logic employed by the Processor Boards 82, 84 in the GPDPs 50, 52, 54 to recognize the process data received by the display panel from the PCS 62 via the data communication ring 64, analyze the data to determine which data, if any, corresponds to which bulbs on that particular panel, determine the state (on or off) desired of that bulb to reflect the current status of the corresponding data, and generate digital signals for transmission to the Decoder Boards 104. The data is then decoded by each of the Decoder Boards 104, which then transmit the appropriate on/off signal to each of the bulb locations on the Bulb Driver Boards 98 or 100.

As previously described, the preferred embodiment of the present invention is adapted to support assignment of seven categories (also referred to hereinafter as functions, types, or classes) of process control variables—DO (digital output) variable, AO (analog output) variable, DI (digital input) variable, AI (analog input) variable, AL (alarm), DS (digital status), and GS (graphic status). A particular process variable includes one of these function codes along with a number which specifically identifies that variable. It will be appreciated by those skilled in the art that each of the variable functions may have different characteristics which dictate examination of different conditions to determine whether a bulb or bulbs corresponding to that category of data should be turned off, turned on, or blinked at any point in time. Thus, the logic employed by the GPDP, particularly the bulb routines (described in FIGS. 8–15) may be altered depending upon the nature and number of the variable categories supported by the system.

Figure 4:
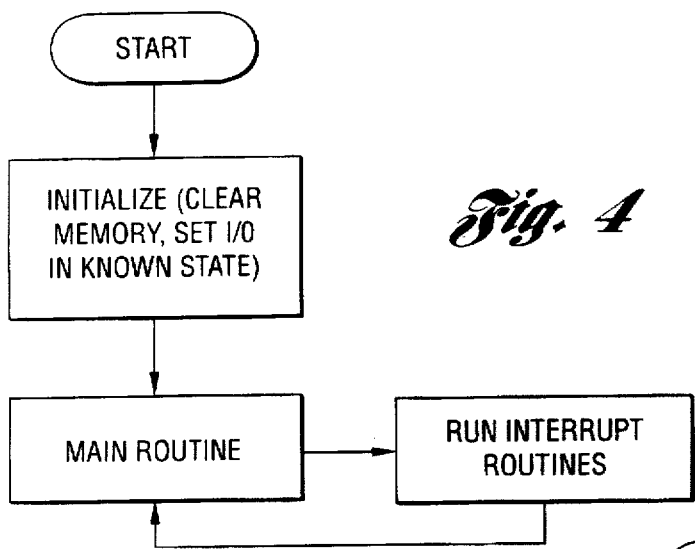
FIG. 4 is a flowchart of the basic operation of the logic for the graphics panel data processor.

FIG. 4 illustrates the basic logic employed by the Graphic Processor Boards 82 and 84 at start-up of the system 40. At start up, memory is cleared and the main routine and interrupt routines are initiated.

Figure 5:
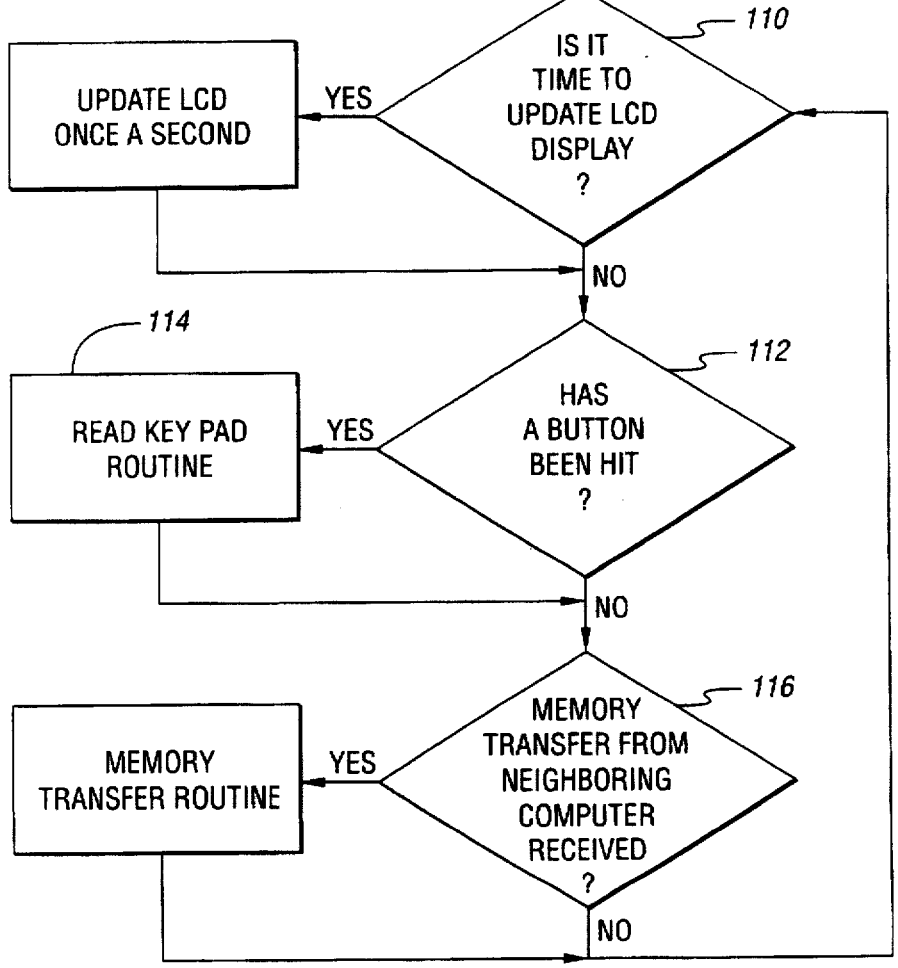
FIG. 5 is a flowchart of the main routine utilized by the graphics panel data processor.

As shown in FIG. 5, the main routine first determines, at 110, whether it is time to update the LCD display 75 on the keypad 76. If it is time (preferably every one second), the system updates the LCD display with one of a series of recurring diagnostic messages. In the preferred embodiment, the display alternately shows the operator various diagnostic messages, including such information as the panel number, the system version number, the last system revision date, and which processor (82 or 84) is transmitting the data to the bulbs. The diagnostic information also preferably includes the revision date and number of bad bulbs on this panel. It will be appreciated by those skilled in the art that various other diagnostic messages can be periodically displayed on the LCD display of the keypad 76 to avail the operator of the status of selected panel conditions.

If it is not time to update the display, the system determines, at 112, whether a button on the keypad 76 has been hit. If it has, a "read keypad" routine is implemented, at 114, to read the data input to the GPDP. It will be appreciated by those skilled in the art that a conventional data input read routine may be employed to acquire this data.

In the preferred embodiment, the system provides five functions that can be performed from the keypad 76—DELETE BULB, ADD BULB, TEST MODE, CHANGE PANEL ID, and MEMORY TRANSFER MODE. One of the options is displayed on the LCD of the keypad 76 when the "menu" key is pressed, and various other options are displayed by repeatedly pressing the "menu" key. Once the desired option is displayed, the "enter" key may be pressed to select that option.

The "DELETE BULB" Function

For example, when "DEL. BULB mode" is displayed on the LCD of the keypad 76. When the "enter" key is pressed, "ENTER FUNCTION TO BE DELETED" is displayed on the LCD of the keypad 76, prompting the operator to enter the variable name to be deleted. After choosing the function of the variable, the operator presses "enter" on the keypad 76 and "ENTER FUNC NUM" is displayed on the LCD display of the keypad 76. The number of the desired variable is then keyed in and displayed. Alternatively, the up/down arrow keys on the keypad 76 may be manipulated to increment or decrement the displayed variable number. Once the desired variable is input to the keypad 76, "enter" may be pressed and "USE → ← FOR NEXT" is displayed on the keypad 76. The left/right arrow keys may then be used to find multiple occurrences of the bulb assigned to the selected variable, and the row and column lights on the panel corresponding to the selected variable are illuminated creating a cross-hairs with the intersection point being the selected bulb. At this point either the left arrow or right arrow keys may again be pressed to identify whether the selected variable is programmed to illuminate bulbs at an additional location on the panel. In the preferred embodiment, the row and column locations will light up one at a time on the panel so that each bulb may individually be deleted or retained. "Enter" is then again pressed and "DELETE XX X ?" is displayed on the LCD of the keypad 76 (where XX is the variable function, and X is the variable number). If "enter" is then pressed, the variable correspondence to that bulb will be deleted and "IT IS GONE!" is displayed. The keypad 76 is then reset back to the initial prompt "DEL. BULB mode". If the "clear" button is pressed, the bulb is not deleted and the system returns to the initial point of the DEL. BULB mode. If a bulb has been deleted, the system updates the EEPROM memory in the Processor Boards 82 and 84 to reflect the revised process variable-to-bulb correspondence.

In the preferred embodiment, the operator can leave any of the keypad functions by pressing the "clear" key.

The "ADD BULB" Function

Another function which is preferably supported as one of the menu options on the keypad 76 is "ADD BULB mode". When this function is selected (by pressing "enter" when "ADD BULB mode" is displayed), the variable function/status and number may be input in the same manner as described above in connection with the DELETE BULB function, the number of the row and column on the panel of the bulb to be added are then entered and the corresponding row and each of the bulbs in the selected row and column are lighted, creating a cross-hairs with the intersection of the cross-hairs being the bulb to be added. At this point, each of the fields corresponding to the data input (i.e., variable function/status, variable number, row number, and column number) may be displayed by pressing the F1 key on the keypad. Upon review and verification that each of the four fields are correct, the operator may press the "enter" key. The light being programmed will then flash five times to indicate that it has been added. The system also serially transfers the new process variable-to-bulb correspondence data to the other processor board's memory. The "clear" button may be pressed to exit the "ADD BULB mode", or "enter" may be pressed to repeat the procedure until all the desired bulbs are programmed.

It will be appreciated by those skilled in the art that the programmable capability of the graphic display system of the present invention, including the "ADD BULB" and "DELETE BULB" functions, allows an operator to quickly configure a panel which is fully populated with an array of bulbs with any desired variable-to-bulb correspondence.

The "TEST MODE" Function

If "TEST MODE" is chosen from the menu on the keypad 76, one of several diagnostic tests may be run. Each of the diagnostic tests supported by the system of the present invention is initiated by pressing the menu button on the keypad 76 until "TEST MODE" is displayed. After pressing "enter", "ENTER TEST NUM MENU" is displayed, and the operator enters the number of the desired diagnostic test. The name of the diagnostic test is then displayed on the LCD of the keypad 76 as hereinafter described in further detail. In the preferred embodiment, eight diagnostic tests may be run. These are explained below.

"TEST ONE BULB" (TEST 1)

One diagnostic test which may be implemented in the preferred embodiment interrogates the operator for a variable function and number and, in response, signals the panel to flash any bulbs on the panel programmed to correspond to the specified variable.

"MANUAL ROW AND COLUMN TEST" (TEST 2)

A second test supported in the preferred embodiment requires the operator to select a panel row number and column, (preferably by using the ← and → to select the column and ↑ and ↓ to select the row) after which the system displays the bulb function, number, column, and row on the display of the keypad 76 and transmits the appropriate signals to light the entire row and column. The identified variable is the variable corresponding to the bulb at the intersection of the selected row and column.

"AUTO ROW AND COLUMN TEST" (TEST 3)

This test automatically scrolls by row and column and lights each of the bulbs on the graphics panel, identifying any burned-out bulbs, and verifying that the processor is correctly addressing the decoder boards and accessing the bulbs. It will be appreciated by those skilled in the art that this diagnostic allows for quick identification, and therefore, quick replacement, of any burned-out bulbs, as well as a quick indication when the system is improperly addressing any of the bulb driver boards.

"FUNCTION TEST" (TEST 4)

The preferred embodiment of the present invention also provides a diagnostic test which, upon programming of a particular function/class of variables, causes the panel to illuminate all bulbs assigned to that function of variable. This is particularly useful, for example, when an operator desires to see the number and location of all alarms.

"BULB BOARD TEST" (TEST 5)

This test checks a test board and one of the display (image) boards on the panel. When a bulb burns out on the test board, the bulb on the image board in the same location will light up. By pressing the up and down arrow keys, the operator can select which board (8 row, 98 or 11 row, 100) to test. It will be appreciated by those skilled in the art that this test is useful for bench testing spare and/or replacement boards.

"CHECK ALL BULBS" (TEST 6)

This test checks all of the bulbs on a graphics panel. The system interrogates each of the bulbs on the panel 46. When it discovers one that is not operating, the row and column for which the bad bulb is the intersection point are illuminated. When the bad bulb is replaced, the row and column bulbs are turned off and the replacement bulb lights for five seconds. The system then automatically proceeds to the next bad bulb, if any. The operator may skip over the bad bulbs (rather than replacing them), by pressing the up arrow key and the test continues until another bad bulb is discovered.

"KEYPAD CHECK" (TEST 7)

This test is utilized to assure functionality of all the keypad buttons. Upon entry of the keypad test, the operator can press each of the keypad buttons, one at a time. The system displays on the LCD which button has been pressed. The operator can leave this test by pressing the "clear" key three consecutive times.

"KEYPAD LCD TEST" (TEST 8)

This test is used to assure the functionality of the LCD dots on the screen of the keypad. When initiated, this test displays "LCD TEST" on the bottom row of the keypad display. The message then moves to the top row of the display and all of the bottom row dots are activated. The message then moves to the bottom row of the display and all of the top row dots are activated.

As will be appreciated by those skilled in the art, various other diagnostic tests may be implemented for the system 40 of the present invention through use of the keypad 76 or other data input device.

Referring again to FIG. 5, if the keypad 76 is not in operation, the system checks, at 116, to determine whether the neighboring computer (82 or 84) is attempting to transfer data from its memory, such as, for example, when the operator has revised the data by adding or deleting bulbs as previously described, or when one of the Processor Boards 82, 84 is being replaced. If data is being transferred, the memory transfer routine is implemented. This routine stores the variable-to-bulb correspondence data from the EEPROM memory on one of the Processor Boards 82 or 84 to the Memory Backup Board 86. It then accepts the variable-to-bulb correspondence data from its neighboring computer in approximately 2k blocks, and writes the data to its own EEPROM to complete the transfer. Thus, the Memory Backup Board provides a back-up copy of the bulb data should there be a shutdown or other malfunction during the data transfer from one Processor Board to the other.

Figure 6:
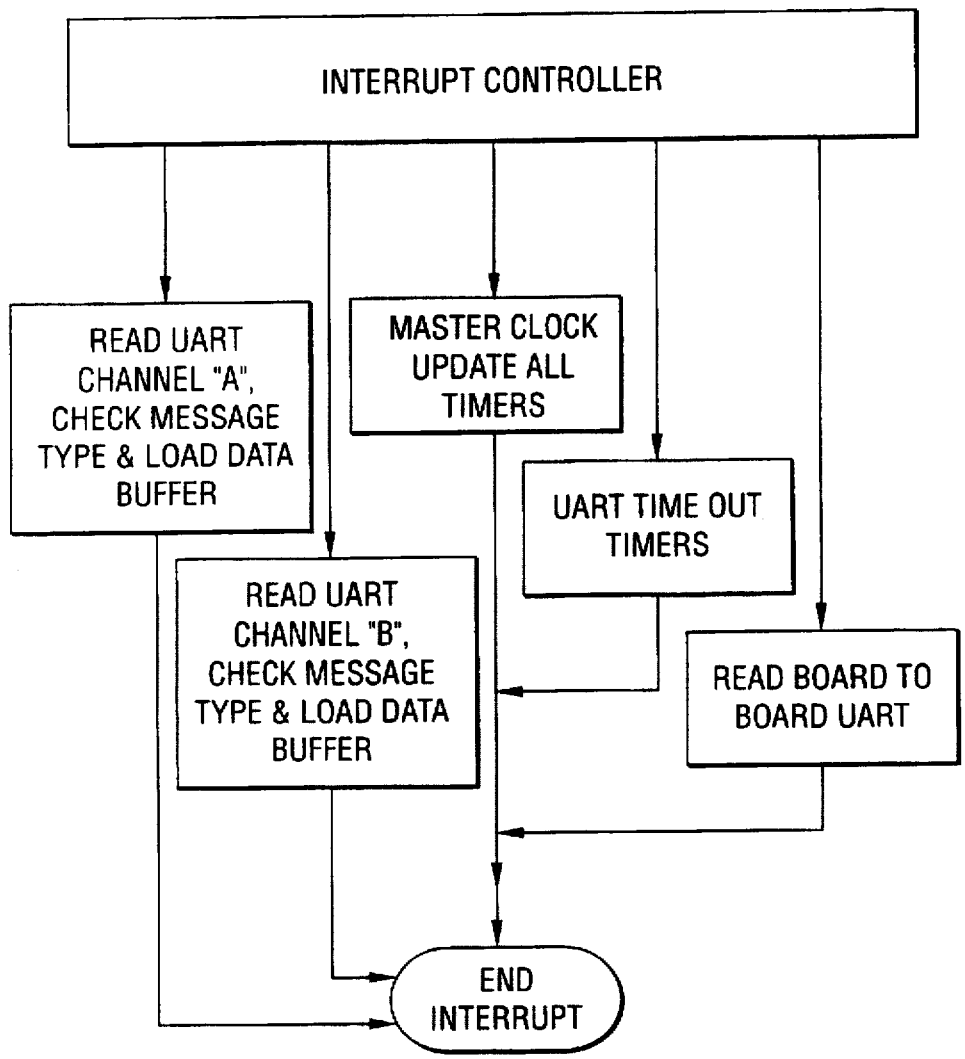
FIG. 6 is a flowchart of the run interrupt routines employed by the system of the graphics panel data processor.

Referring to FIG. 4, each of the GPDPs repeatedly run a series of interrupt routines in addition to the main routine. FIG. 6 illustrates the interrupt controller and the main interrupt routines implemented by the system of the present invention. At each interrupt, the system checks each of UART Channel A (the primary communication path), UART Channel B (the secondary communication path), and the board-to-board UART to see if there are any incoming messages. The system also references the master clock to update all of the system timers. Finally, the system checks the UART Time Out Timer. If the Time Out Timer has run, the system assumes an error or malfunction has occurred in reading one of the UART's, terminates interrupt processing and returns to the main routine.

In the preferred embodiment, the PCS 62 is configured to transmit data in five different data messages. Message 1 is a four word message which is received, identified, and retransmitted by each of the GPDPs in the system to verify to the PCS that the Communications Ring 64 is operating. Message 2 is a 39-word diagnostic message which is received, identified, updated by each GPDP to indicate the current status of that GPDP, and retransmitted to the next GPDP in the ring. Message 3 is a four-word message which indicates that the next block of data being transmitted by the PCS (or retransmitted by one of the GPDPs in the chain) is Message 4. Message 4 is a 4k, 16 bit word block containing the process variable data. Message 5 is a four-word diagnostic message which is transmitted to determine continuity of the primary and secondary paths between a GPDP and the PCS. Message 5 is transmitted only when it has been determined that there is an interruption in both the primary and secondary paths of the Communications Ring.

In the preferred embodiment, each of Messages 1, 2, 3 and 5 are read and stored in their entirety before they are retransmitted on the Communications Ring. However, to insure that each of the GPDPs timely receives the bulb data, each word of the 4k word block of Message 4 (the process variable data) is read, stored and retransmitted individually on the Communications Ring. This insures that the relatively longer data of Message 4 is quickly transmitted to each of the panels in the system.

Figure 7:
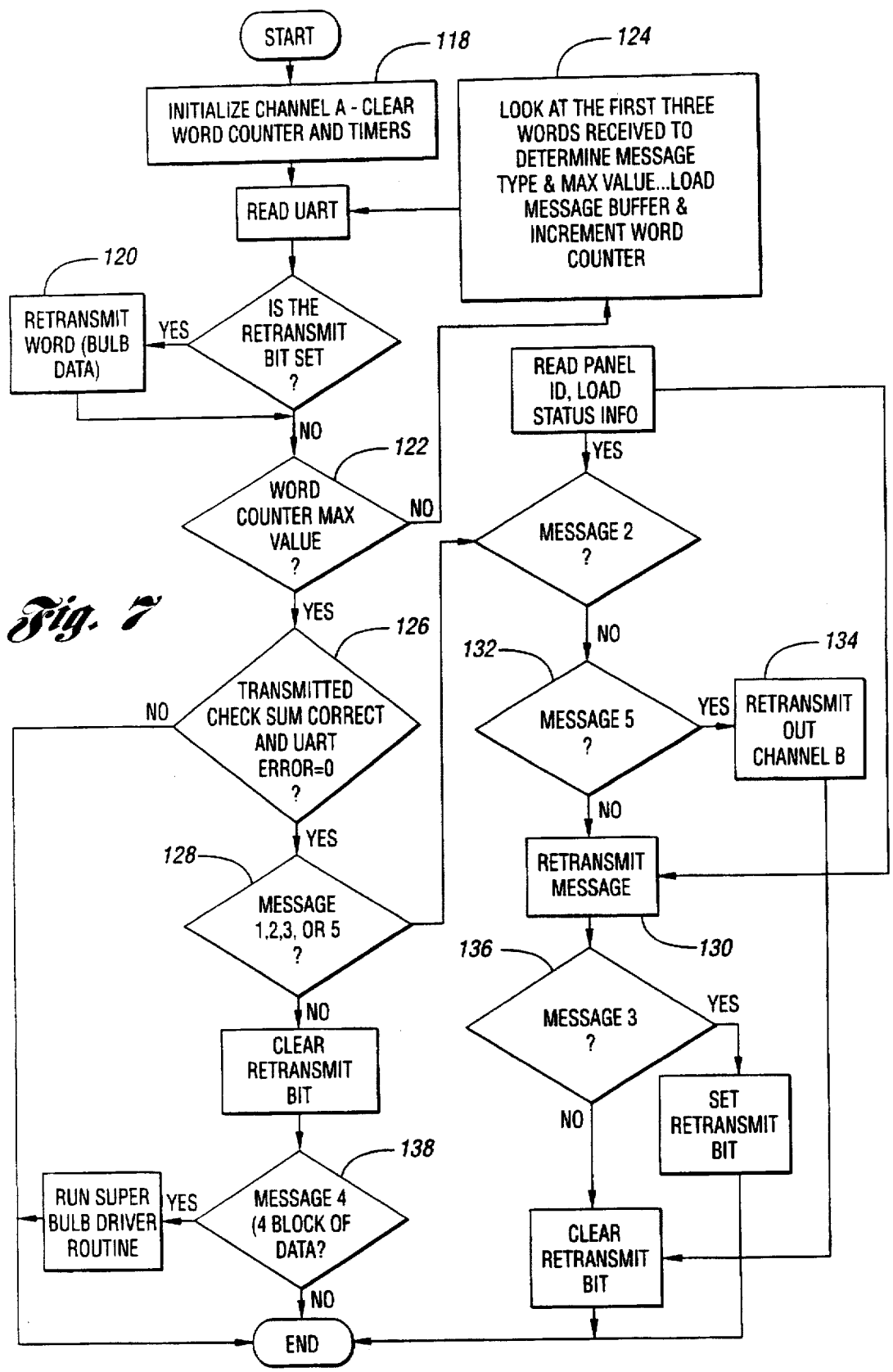
FIG. 7 is a flowchart of the "Read UART Channel A" routine utilized by the graphics panel data processor.

FIG. 7 illustrates the "READ CHANNEL A UART" routine in greater detail. The system first initializes Channel A by clearing the word counter and all timers at 118. The system determines whether the retransmit bit is set. The retransmit bit is set (by Message 3) when the next data to be read by the UART is the 4k word block of process variable data (Message 4). In that case, the data word read by the UART is immediately transmitted, at 120, to the next point on the Communications Ring. If the retransmit bit is not set, the system proceeds, at 122, to check the value of the word counter. If the word counter has not reached the maximum value (set at four words for each of Messages, 1, 3 and 5, 39 words for Message 2 and 4k words for Message 4), the data word is stored in the message buffer and the word counter is incremented at 124, and the system reads the next word received by the UART. This process is repeated until the word counter is equal to the maximum value (i.e., the entire message has been received). Once the entire message has been received, the system checks, at 126, to determine if the checksum is correct and if there is no indication of a UART error. If the checksum is incorrect or there is a UART error, the system exits this routine, assuming a data transmission error, and awaits receipt of the next message. If the checksum is correct and there is no indication of a UART error, the system then determines, at 128, if Message 1, 2, 3 or 5 has been received. If the message received is 1, 2, 3 or 5, the system proceeds to determine whether the data message is Message 2. If it is Message 2, the panel diagnostic message, the system reads the panel ID, and where appropriate, loads the status information for this panel, and retransmits the message, at 130, on the Communications Ring.

If the message is not Message 2, the system determines, at 132, whether the message was Message 5. If Message 5 was transmitted, there are interruptions in both the primary and secondary communication paths somewhere on the Communication Ring to which this processor is connected. The system retransmits the message on Channel B (the secondary path), at 134, clears the retransmit bit and exits. It will be appreciated by those skilled in the art that a successful Message 5 transmission from the PCS 62 to a particular GPDP will verify to the PCS that the portion of the primary path and secondary path forming a loop from the PCS to that GPDP is continuous. Transmission of this Message 5 to each of the GPDPs in the system will thus aid service personnel in determining the location of any interruptions in the Communications Ring.

If the message is not Message 5, the system then checks to determine whether the message was Message 3, at 136. If Message 3 was transmitted, indicating to the system that the next message to be transmitted is to be the 4k word block of process variable data of Message 4, the system sets the retransmit bit and exits. Otherwise, (i.e., Message 1 was transmitted) the system clears the retransmit bit and exits the routine.

If the system determines, at 128, that the data message is not Message 1, Message 2, Message 3, or Message 5, it checks to determine whether the data is Message 4 (i.e., the 4k word block of bulb data), at 138. If it is, the system runs the super bulb driver routine, as further described hereinafter.

As is appreciated by those skilled in the art, the UART routines described herein are configured to read and store the various data messages and retransmit them to the next panel in the chain. While the preferred embodiment of the system employs serial interconnection of each of the panels in a daisy chain fashion requiring retransmission of the data to communicate the data to each point in the chain, the system may also be configured to allow the panel communication devices 56, 58, 60 on each of the panels to receive data messages from the communication rings without interrupting the transmission of the data message on the ring. In this alternative configuration, retransmission of the data message by each of the panels would be unnecessary.

A "READ CHANNEL B UART" routine (not shown) substantially identical to the routine flowcharted in FIG. 7 (except that all references in FIG. 7 to "Channel A" should be read as "Channel B", and vice versa), is preferably utilized to perform the identical functions on the secondary loop of the Communications Ring.

Figure 8:
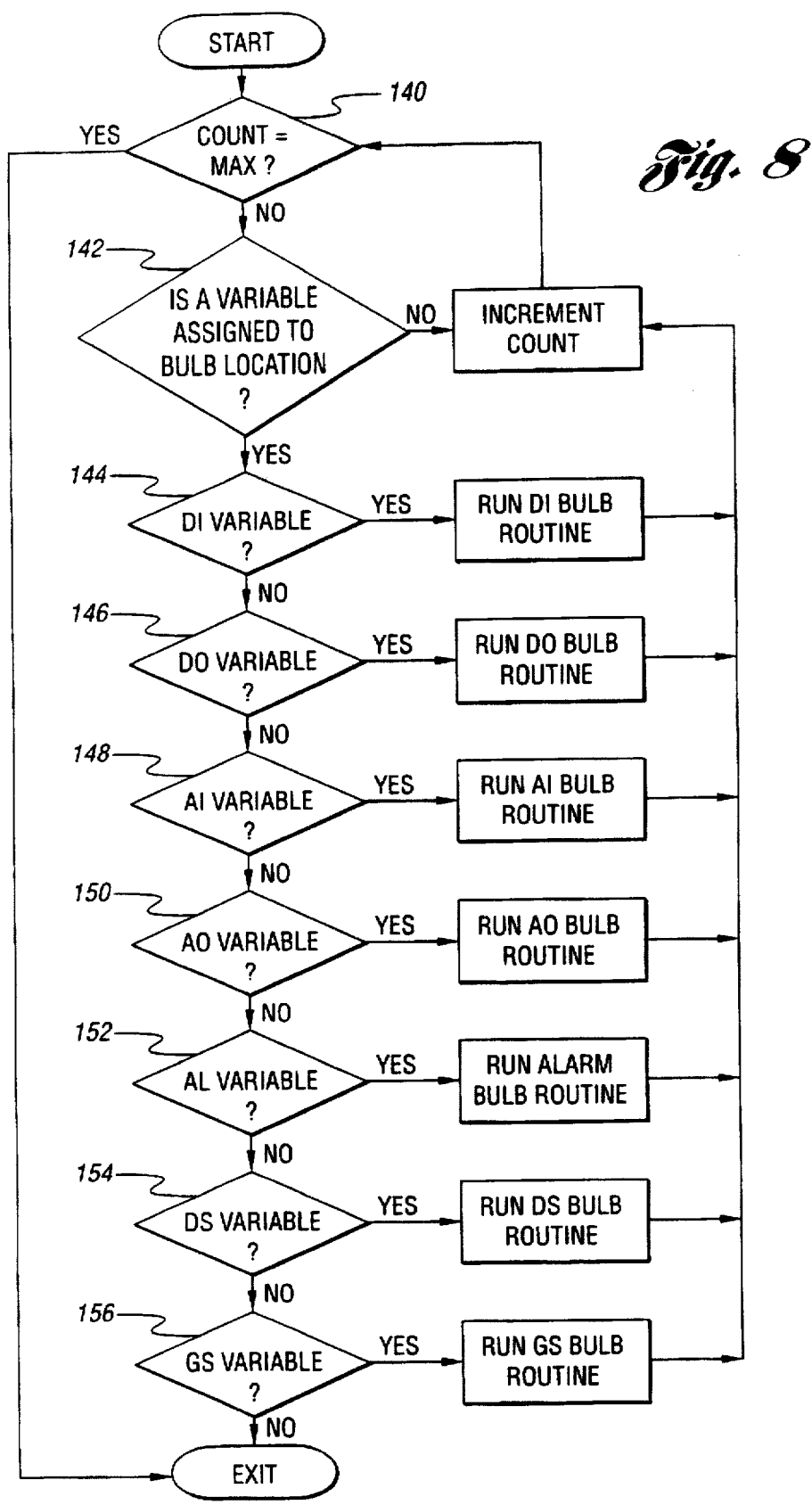
FIG. 8 is a flowchart of the "Run Bulb Driver" routine utilized by the graphics panel data processor.

FIG. 8 illustrates the super bulb driver routine utilized by each of the read UART Channel A and read UART Channel B routines in the present invention. This routine preferably employs a counter equal in value to the total number of bulb locations on the panel. The routine checks the counter at 140 and, if it hasn't reached the maximum count, determines whether a variable is assigned to the bulb location corresponding to the current count. If not, count is incremented and the routine is repeated. If a variable is assigned to the bulb location corresponding to the current count, the super bulb driver routine accesses the variable-to-bulb correspondence data stored in memory at the counter location and determines at 142–156 which type of variable is at that bulb location. As previously described, in the preferred embodiment, the lights on the panel may correspond to DI (digital input), DO (digital output), AI (analog input), AO (analog output), AL (alarm), DS (digital status), or GS (graphic status) variables utilized by the PCS. Once the system determines which of the functions of variable is represented by the data, the appropriate bulb routine is called. The bulb routines, flow charted in FIGS. 9–15, then read the data transmitted from the PCS and stored by the UART read routine into the data buffer, and determine whether to turn the corresponding bulb on or off.

Figure 9:
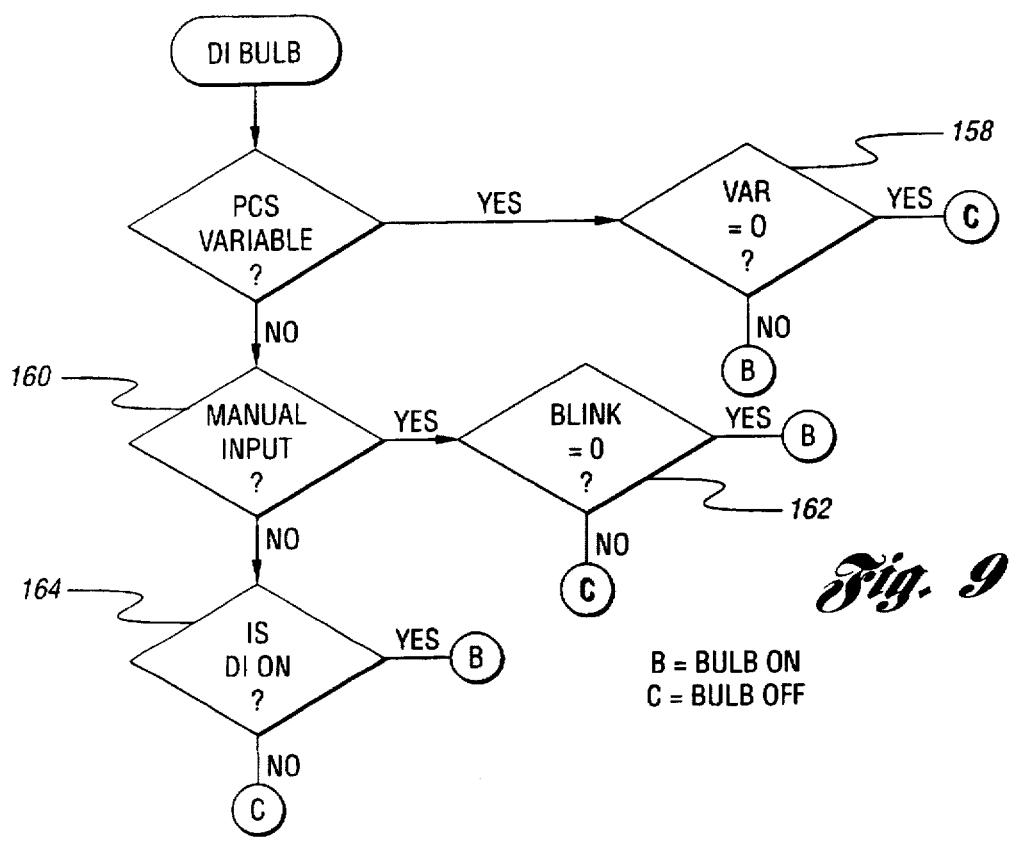
FIG. 9 is a flowchart of the "DI Bulb" routine utilized by the graphics panel data processor.

FIG. 9 illustrates a basic bulb routine which is shown as being utilized for DI variables. In the preferred embodiment, the system first determines whether the PCS has assigned a value to this variable, such as where the PCS automatically determines the value for the variable independent of the actual field input, or where the PCS otherwise imposes a threshold value which is utilized by the control system in place of the field input. If the PCS has established a value for the variable, the system, at 158, determines whether the variable equals zero. If it equals zero, the bulb is turned off. If the variable is non-zero, the bulb is turned on.

If the PCS has not established a value for the variable, the system then checks, at 160, to determine whether a value for this DI variable has been manually input by the operator. If so, the manually input variable is referenced and otherwise utilized by the PCS 62 in place of the digital input value sensed in the field. The system blinks the bulb corresponding to this variable to indicate it is "in manual." The system, at 162, checks "blink", a variable which may be alternated on a timed basis between 0 and 1. If "blink" is 0, the system turns the bulb on. If "blink" is 1, the system turns the bulb off. It will be appreciated by those skilled in the art that, since the bulb routines are accessed more frequently than once per second, by changing the value of "blink" to be, for example, 0 for 12 seconds and 1 for 4 seconds, a unique blinking pattern can be generated for all bulbs corresponding to DI (and other) variables which are in manual.

If this variable has not been manually overridden, the system checks, at 164, to determine whether a true digital input is being received from the field. If so, the bulb is turned on. If not, the bulb is turned off.

It should be noted that, as used herein, a manually input value (or manual override) is a value substituted by the operator for the purpose of sustaining the substituted value in place of the variable. For example, a manually input DI, if true, will indicate that the associated switch is closed even if it is not.

Figure 10:
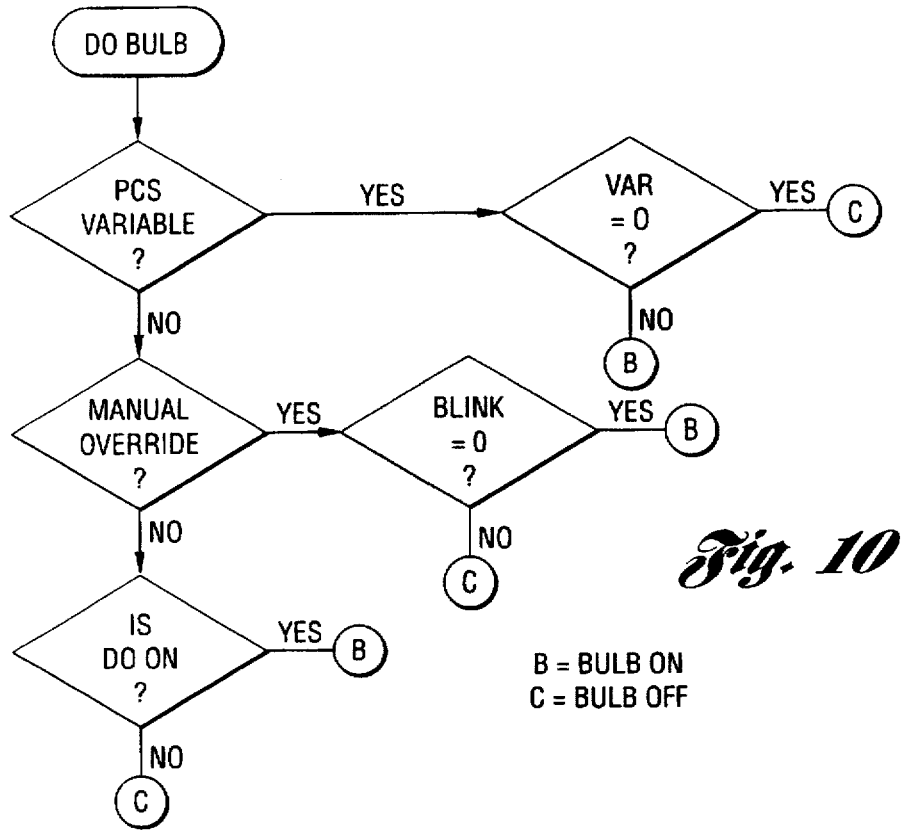
FIG. 10 is a flowchart of the "DO Bulb" routine utilized by the graphics panel data processor.

FIG. 10 is shown as utilizing the same basic bulb routine as FIG. 9 for the DO type variables.

Figure 11:
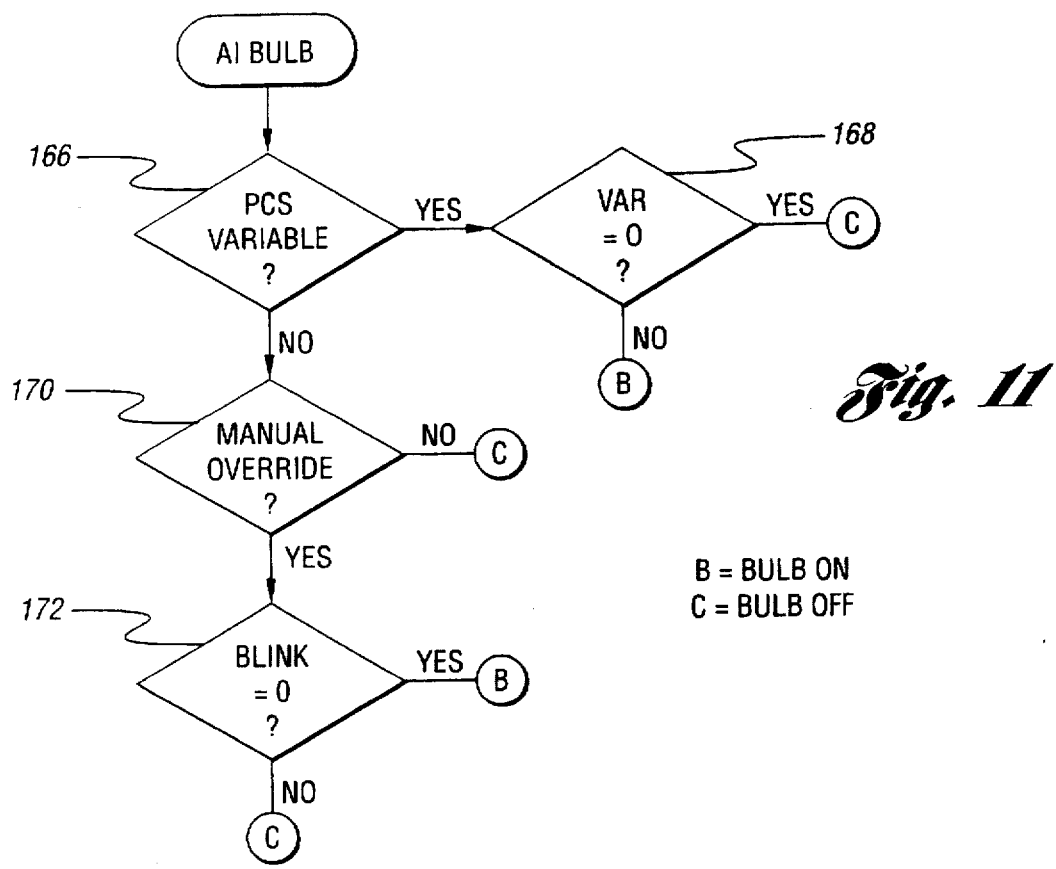
FIG. 11 is a flowchart of the "AI Bulb" subroutine utilized by the graphics panel data processor.

FIG. 11 illustrates the bulb routine utilized for AI variables in the preferred embodiment. The system first determines, at 166, whether the PCS has assigned a value to this variable. If so, the value of the variable is checked at 168. If the variable is equal to zero, the bulb is turned off. If the value of the variable is non-zero, the bulb is turned on.

If the PCS has not assigned a value to this variable, the system determines, at 170, whether a value for this analog input has been manually input by the operator. If not, the bulb is turned off. If so, the system blinks the bulb, at 172, in the same manner described previously.

Figure 12:
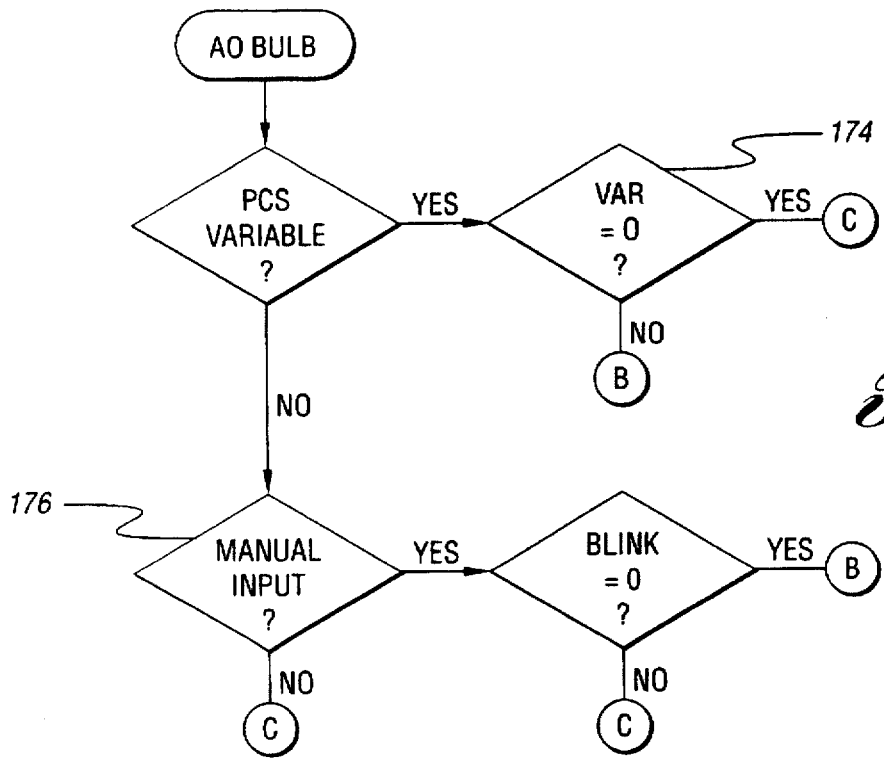
FIG. 12 is a flowchart of the "AO Bulb" subroutine utilized by the graphics panel data processor.

FIG. 12 illustrates a bulb routine which may be utilized for AO variables. The system first determines whether the PCS has assigned a value to this variable. If so, the value of the variable is checked at 174. If the variable is equal to zero, the bulb is turned off. If the value of the variable is non-zero, the bulb is turned on.

If the PCS has not assigned a value to this AO variable, the system checks, at 176, to see if an analog output corresponding to this variable has been manually input. If it has, the bulb is blinked, at 192, in the manner previously described. If a value has not been manually input, the bulb is turned off.

Figure 13:
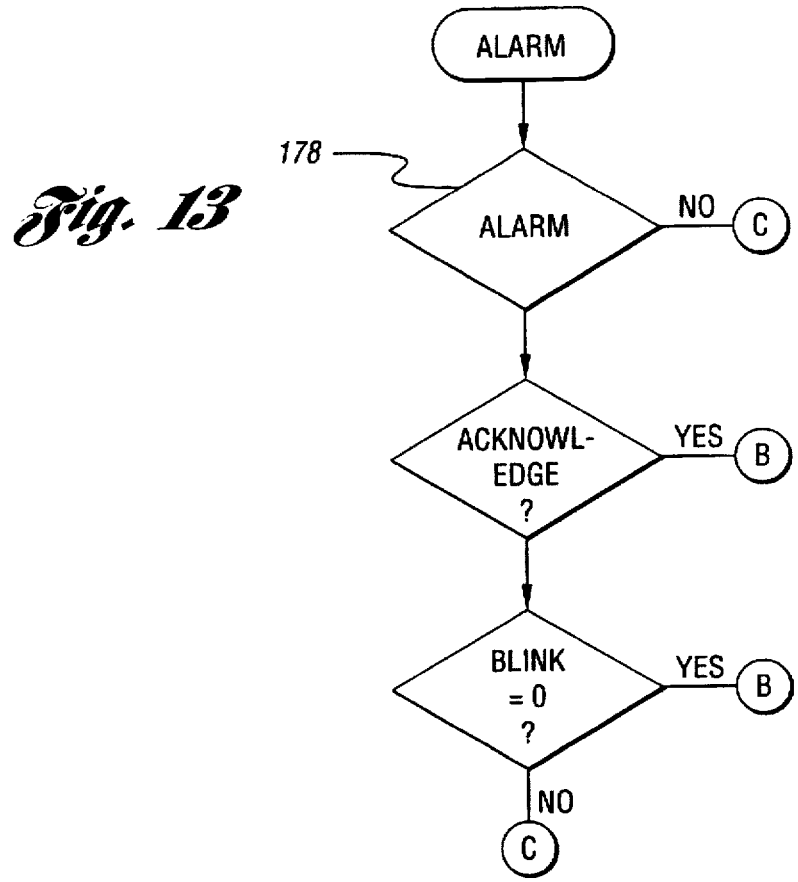
FIG. 13 is a flowchart of the "Alarm Bulb" subroutine utilized by the graphics panel data processor.

FIG. 13 illustrates the alarm bulb routine. The system checks, at 178, to determine whether a particular alarm variable is set (i.e., as the alarm has been activated). If not, the corresponding bulb is turned off. If the alarm has been set, the system then determines whether an acknowledgement has been entered for the alarm (i.e., indicating awareness of the fact that the alarm is true). If so, the bulb is turned on. If not, the "blink" flag is checked and the light is flashed on and off as described above.

Figure 14:
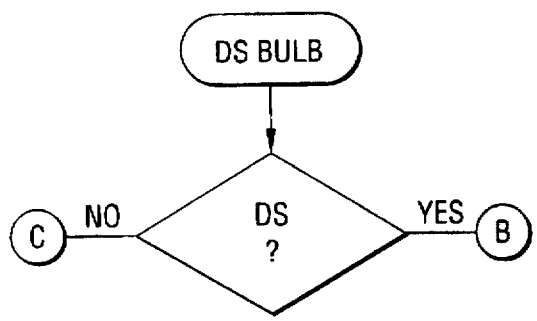
FIG. 14 is a flowchart of the "DS Bulb" subroutine utilized by the graphics panel data processor.

FIG. 14 illustrates a bulb routine for DS type variables. Since DS variables indicate the status of component operation and/or individual components within the process control computer, they are merely monitored to determine whether a particular DS variable is active. If it is active, the bulb is turned on. If not, the bulb is turned off.

Figure 15:
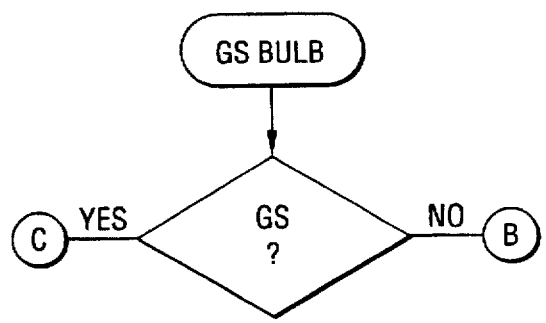
FIG. 15 is a flowchart of the "GS Bulb" subroutine utilized by the graphics panel data processor.

FIG. 15 shows an identical flowchart for the GS type variables, since the GS, or "graphics status" class of variables are utilized to indicate the status of operation and/or of components within the programmable graphics display system of the present invention.

It will be appreciated by those skilled in the art that any or all of the bulb routines of FIGS. 9–15 may be altered depending upon the nature of the individual class of variable utilized by the process control system which is supported by a graphics display system of the present invention. For instance, the system may treat all variables as a single class and turn the corresponding bulbs for all variables on when a signal is received from the PCS. The system may also check to determine, for certain classes or specified individual variables, whether a zero value turns that bulb on (and a non-zero turns the bulb off) instead of vice versa. Alternatively, the routines may be altered to reflect a different hierarchy controlling which input (e.g., the field input, a PCS input, or a manual input) takes precedence in determining whether the corresponding bulb is turned on or off. Other modifications and/or enhancements will be apparent to those skilled in the art of interfacing a process control system with the display of the present invention.

Specific "blink" flags may be utilized for each type of variable so that each type blinks in a different timed pattern when it is in manual. It will also be appreciated by those skilled in the art that a light could be blinked at various rates, as high as 30 blinks per second, corresponding to the value of a particular input. The blink rate could, for example, be a scalar factor of the digital inputs, thereby providing a graphic indication of the value of the input as well as its existence.

Figure 16:
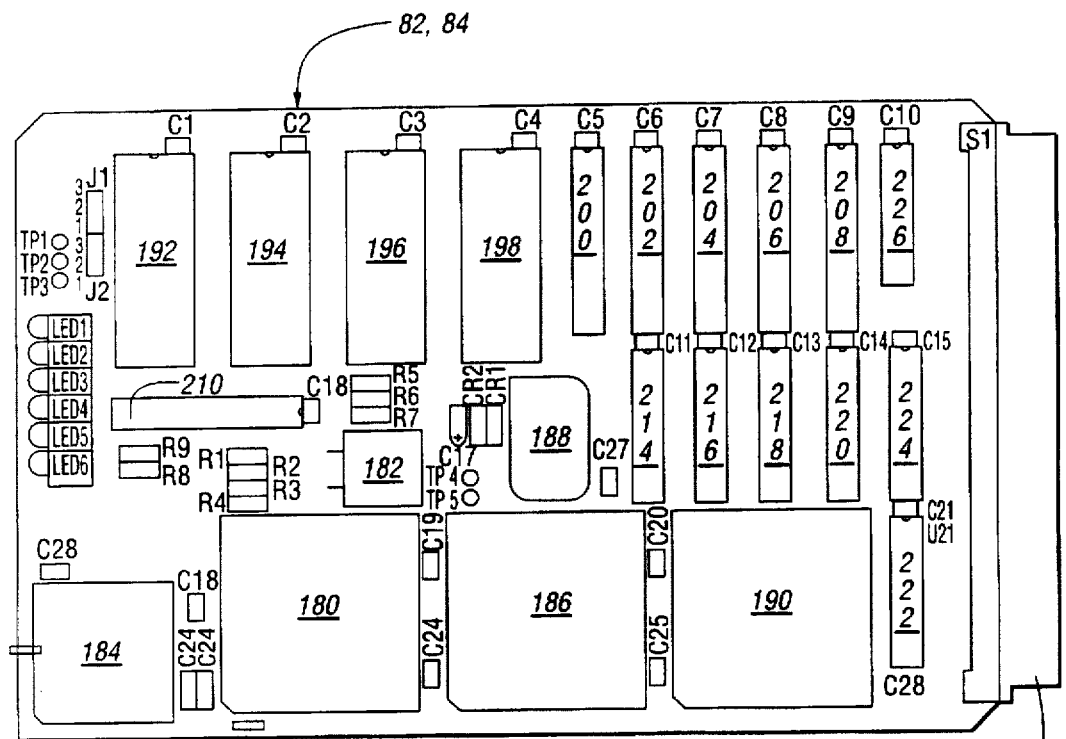
FIG. 16 is a diagram of the Processor Board utilized in the system of the present invention.

FIG. 16 illustrates the components of the Processor Boards 82, 84 in the preferred embodiment. Each Processor Board 82, 84 includes a central processing unit (CPU) 180, which is preferably a 16 bit 16 Mhz microprocessor, such as Intel No. 80C186. The CPU 180 is preferably driven by a 25 Mhz crystal 182. A programmable logic device (PLD) 184 is programmed to serve as the address decoder and logic decoder for the two channel universal asynchronous receiver/transmitter (UART) 186, which serves as the receiver/transmitter for both the primary and secondary paths (A and B channels). PLD 184 is preferably a 44 pin device available as part no. EPM5064 from Altera, Inc. UART 186 is preferably a two channel serial device available from Zilog, Inc. (as part no. Z16C30), and is driven by an 8 Mhz clock 188.

Each of LED 1 and LED 2 status lights are driven by PLD 184, and may be used to indicate whether data is being received by each of the channel A UART and the channel B UART, respectively.

PLD 190 is preferably programmed to provide all the decoding logic for the board, the IO addresses, and the board-to-board UART. This PLD also drives the LED 3-LED 6 status lights which may be utilized to indicate the operating status of the various functions supported by PLD 190. PLD 190 is also preferably a 68 pin device available as part no. EPM5128 from Altera, Inc.

Two 8k×8 EEPROMs 192, 194 are preferably utilized as memory to store the variable-to-bulb correspondence data for the board. These EEPROMs are available from Xicor, Inc., as part no. X2864AP.

Two 32k×8 EPROMs 196, 198 are utilized as programmable read only memory in which the system logic is coded. These devices are available as part no. 27C256 from Intel Corporation.

The Processor Boards 82 and 84 also preferably include four 64k×4 random access (RAM) memory chips 200, 202, 204, 206 for additional memory storage. Two 8 bit bi-directional buffer chips 208, 210 are employed as data buffers for connector 212. Two additional 8 bit chips 214, 216 serve as address latches for the CPU 180. Three additional 8 bit chips 218, 220, 222 are also preferably provided to serve as miscellaneous buffers for connector 212. Two chips 224 and 226 are also provided for use as address buffers for connector 212. A 96 pin DIN connector 212 is provided for connection into the appropriate connectors 228, 230 on the Backplane Board 88.

Figure 17:
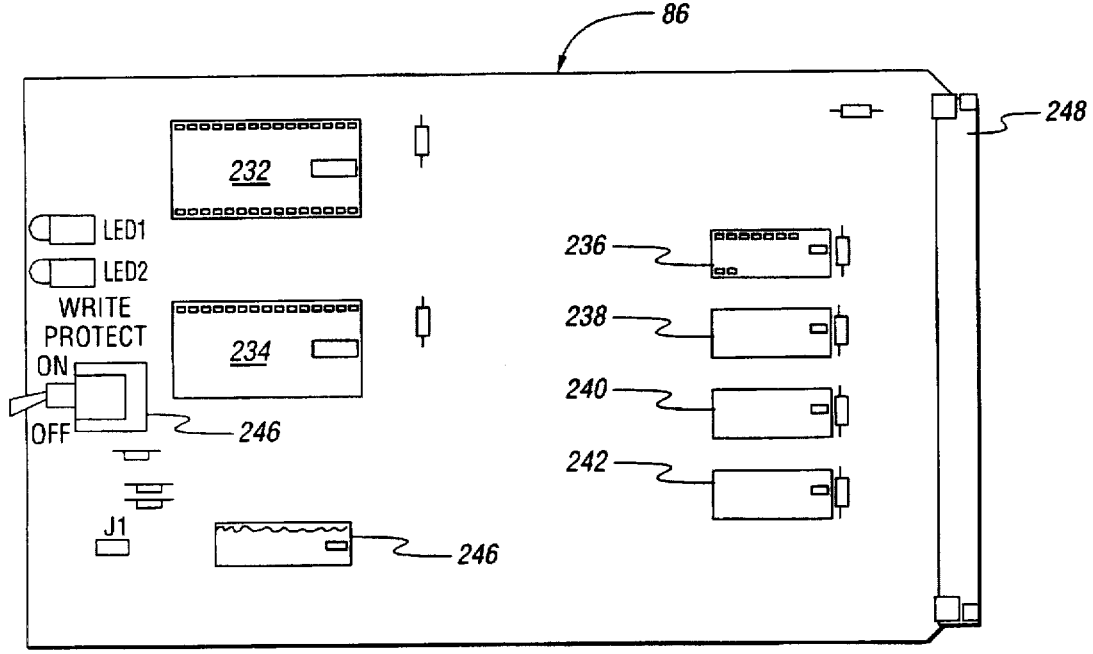
FIG. 17 is a diagram of the Memory Backup Board utilized in the system of the present invention.

FIG. 17 illustrates the components on the Memory Backup Board 86. This board preferably includes two 8k×8 EEPROMs 232, 234 which provide the back-up memory for the variable-to-bulb correspondence data. EEPROMs 232 and 234 are available as part no. X2864AP from Xicor, Inc. Four 8 bit chips 236, 238, 240, 242 are also preferably provided to serve as address and data buffers. A 24 pin PLD 244, manufactured as part no. P5AC312 by Intel, Corp., is encoded to provide the address decoding for the board and drive LED1 and LED2. These LEDs may be used to indicate the operating status on the board. In the preferred embodiment, LED1 is illuminated when the write-protect switch is enabled. LED2 is not utilized. An ON/OFF switch 246 may also be provided to provide a mechanical write-protect switch for the Board 86. A 96 pin DIN connector 248 is provided to interconnect the Memory Backup Board 86 with the Backplane Board 88 at mating connector 250.

Figure 18:
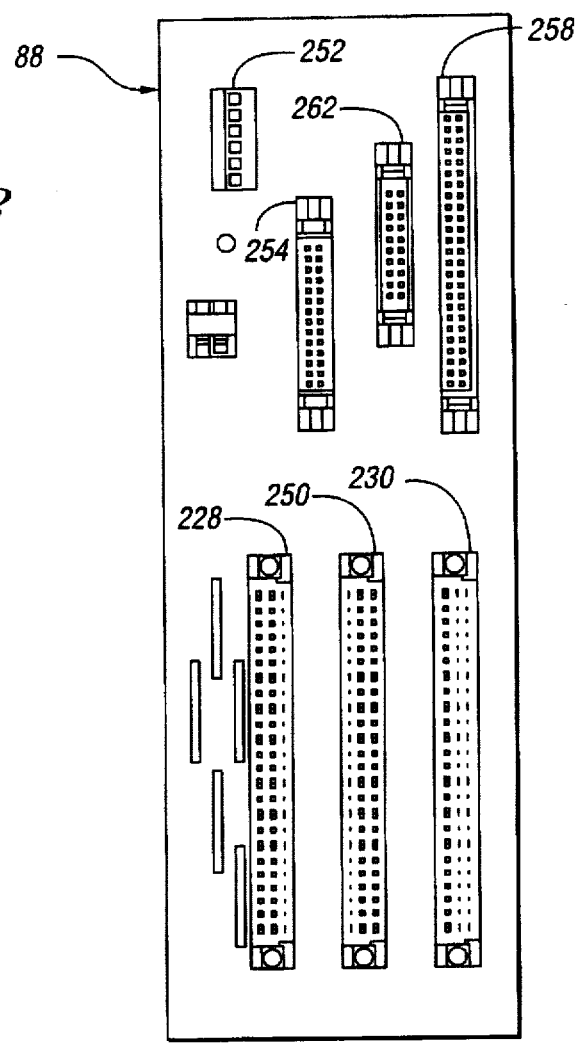
FIG. 18 is a diagram of the Backplane Board utilized in the system of the present invention.

Referring now to FIG. 18, the Backplane Board 88 preferably includes connectors 228 and 230 for connection to the Processor Boards 82, 84, and connector 250 for connection to the Memory Backup Board 86. A six-conductor power cable interconnects the Power Distribution Board 102 and the Backplane Board 88 at connector 252. An 18 inch, 26 conductor ribbon cable is connected at connector 254 and with connector 256 on the Fiber Mount Board 90 (shown in FIG. 23) to provide communication of the TTL data from the data communication ring 64 to the Processor Boards 82, 84. A 50 conductor ribbon cable is connected to 258 and to 260 on one of the Decoder Boards 104 (shown in FIG. 19) to provide the bulb information from the active one of the Processor Boards 82, 84 to the bulbs 48. The remaining Decoder Boards 104 are interconnected in series via 50 conductor ribbon cables and their respective connectors 260 to provide the data link for the bulb information transmitted from the Processor Boards 82, 84. Connector 262 is provided to receive a twenty-conductor cable which connects the keypad 76 to the system 40.

Figure 19:
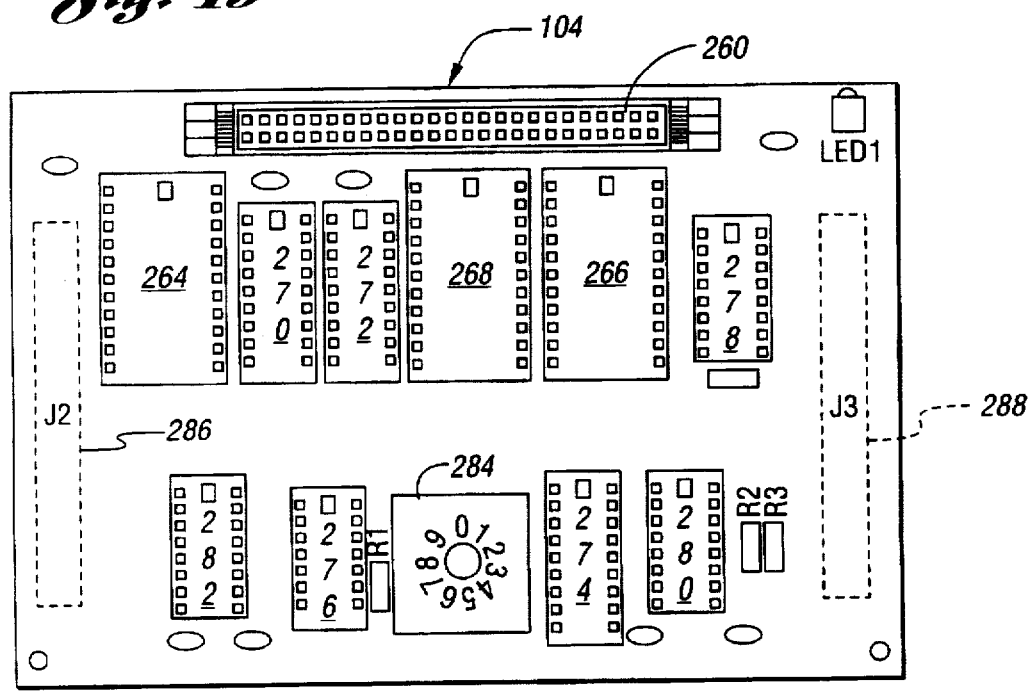
FIG. 19 is a diagram of the Decoder Board utilized in the system of the present invention.

A series of Decoder Boards 104 which decode the bulb information sent from the Processor Boards 82, 84 for transmission to the Bulb Driver Boards 98, 100 are each preferably configured as shown in FIG. 19. Decoders 264 and 266, available as part no. 74LS154 from Signetics Corporation, are provided for use as column decoders for each of the 30 columns of 8 lights on Bulb Driver Board 98, and the lowermost 8 lights in each of the 30 columns on Bulb Driver Board 100. Decoder 268, also available as part no. 74LS154 from Signetics Corp., is provided for use as group decoders for each of the groups of 8 bulbs (delineated by dotted lines in FIG. 21) in the top three rows of bulbs on Bulb Driver Board 100. Address buffers 270, 272, 274 are also available from Signetics Corp. as part no. 74LS244. Decoder 276, available from Signetics Corp. as part no. 74LS138, is provided as a board address decoder for selecting one of the six Bulb Decoder Boards. Eight input, three-state multiplexers 278 and 280, available from Signetics Corp. as part no. 74LS251, are provided as bulb track selectors for. A NOR gate 282 is provided for miscellaneous logic. A switch 284 is provided as a board select switch for setting a unique decoder board number for each board.

A pair of 44 pin connectors 286, 288 are provided on either side of the board 104 so that one of the connectors 286, 288 is conveniently positioned to press fit into a mating connector (not shown) on the associated Bulb Driver Board 98 or 100.

Figure 20:
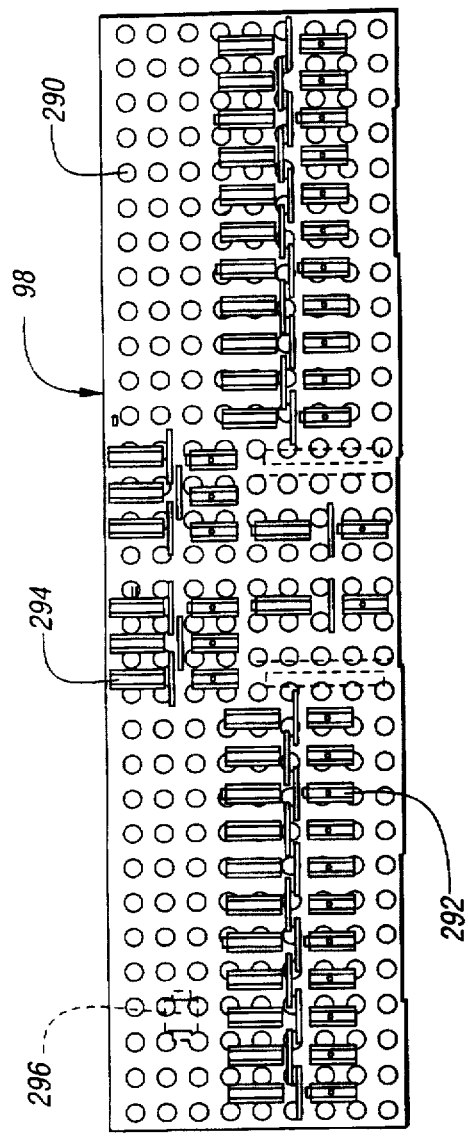
FIG. 20 is a diagram of one of the Bulb Driver Boards utilized in the system of the present invention.
Figure 21:
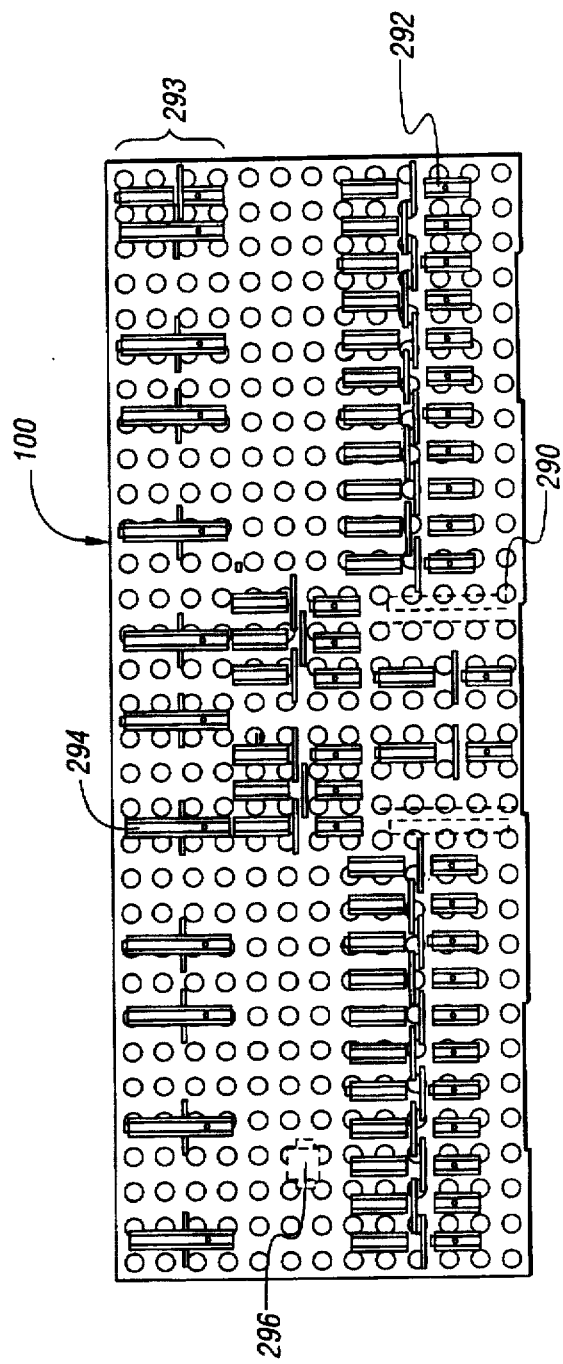
FIG. 21 is a diagram of another Bulb Driver Board utilized in the system of the present invention.

Referring now to FIGS. 20 and 21, each of the Bulb Driver Boards 98 and 100 includes a plurality of PC mounted bulb sockets (shown as circles 290), available from IDT, Incorporated, are adapted for snap fitting No. 56 wedge base 5V bulbs onto the boards. Each of the boards 98 and 100 also includes a plurality of addressable latch decoder bulb-driver chips 292, each of which transmits the electrical signal to turn on one or more of eight bulbs associated with the chips 292. These chips 292 are available from Signetics Corp. as part no. NE590. A plurality of bulb tracker chips 294 for monitoring the operability of eight associated bulbs. Bulb Driver Board 98 (shown in FIG. 20) preferably consists of eight rows by thirty columns of bulbs, and includes thirty each (one each for each row of 8 bulbs) of bulb driver chips 292 and bulb tracker chips 294. In the preferred embodiment, five Bulb Driver Boards 98 are utilized for each panel.

Bulb Driver Board 100 preferably includes eleven rows by thirty columns of bulbs, and includes forty-two each of bulb driver chips 292 and bulb tracker chips 294. In the preferred embodiment, 30 each of the bulb driver chips 292 and bulb tracker chips 294 are arranged to drive the lower 8 rows of the 30 columns of Bulb Driver Board 100 in the identical configuration to that of Bulb Driver Board 98. The 90 bulbs in the upper three rows of 30 columns (at 293) on Bulb Driver Board 100 are supported in groups of eight by the remaining 12 each of the bulb driver chips 292 and bulb tracker chips 294 as shown in FIG. 21. One of the Bulb Driver Boards 100 is utilized in the preferred embodiment of the invention.

Thus, in the preferred embodiment, each of the light panels 42, 44, 46 includes 1,530 bulbs. However, it will be appreciated by those skilled in the art that different configurations of Bulb Driver Boards may be designed to accommodate different panel sizes and bulb capacities without departing from the spirit of the present invention.

Each of Bulb Driver Boards 98 and 100 also includes a 9 pin Amp connector 296 which is connected to one of connectors. 298, 300, 302, 304, 306, 308 on the Power Distribution Board 102 (shown in FIG. 24) for supplying power to the bulbs on that board.

Figure 22:
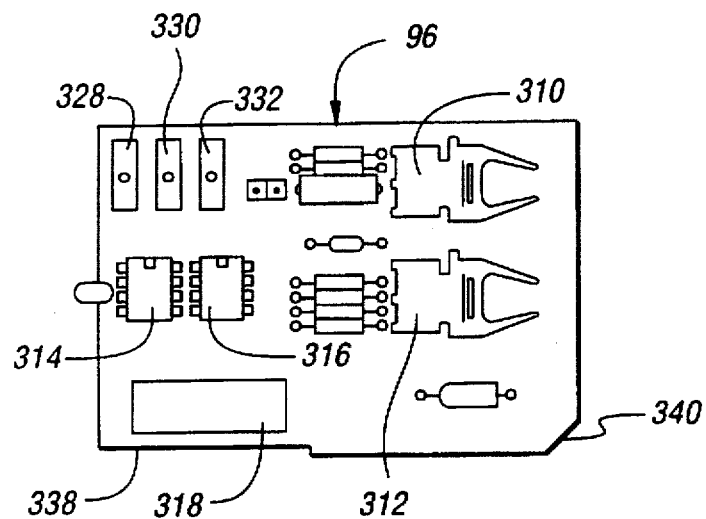
FIG. 22 is a diagram of the Plastic Fiber Driver Board utilized in the system of the present invention.

FIG. 22 illustrates the Fiber Driver Board 96 components, which preferably includes a fiber optic transmitter 310, and a fiber optic receiver 312, each available from Hewlett Packard, for transmitting and receiving, respectively, the serial data through the plastic fiber Communication Ring 64. An integrated circuit 314, available from National Semiconductor as part no. 75451, is provided for driving the fiber optic transmitter 310. A second integrated circuit 316, available from National Semiconductor as part no. LT1016, is also provided for managing the data communicated to the fiber optic receiver 312. A 12 pin Connector 318 is provided for connection to one of Connectors 320, 322, 324, 326 on the Fiber Mount Board 90.

Each of the Fiber Driver Boards 96 are connected in a perpendicular fashion to the Fiber Mount Board 90 at one of the four Connectors 320, 322, 324, 326. Test points 328, 330, 332 are preferably provided on the Fiber Driver Board 96 to allow for direct access by service personnel to determine whether signals are being transmitted and/or received by the Board.

Figure 23:
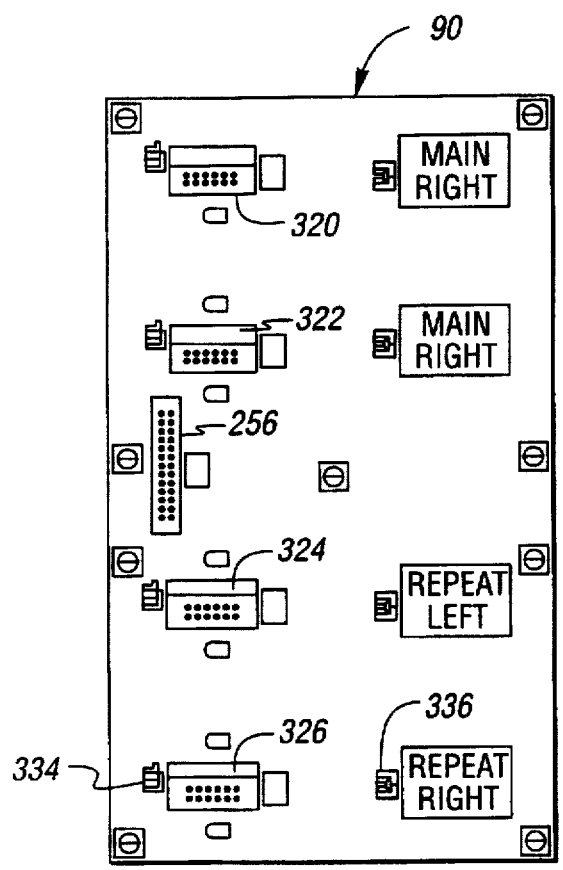
FIG. 23 is a diagram of the Fiber Mount Board utilized in the system of the present invention.

FIG. 23 illustrates the components of the Fiber Mount Board 90, which provides the connecting point for the four Fiber Driver Boards 96 interconnecting each panel to the four fiber rings utilized in the system of the preferred embodiment. This Fiber Mount Board 90 is utilized with the Fiber Driver Board 96 when plastic fibers are used for optical communication, as with the preferred embodiment of the present invention. Plastic fibers are typically utilized when the information is communicated over distances of 50 meters or less. At greater than 50 meters, glass optical fibers may be utilized with a Fiber Driver Board of a modified design (not shown) which includes glass fiber optical receivers and transmitters also available from Hewlett Packard. However, Fiber Mount Board 90 may be utilized with either a glass or plastic fiber network. Fiber Mount Board 90 includes a 26 pin connector 256 which connects via a 26 conductor ribbon cable to connector 254 on the processor Backplane Board 88. Four 12-pin Connectors 320, 322, 324, 326 are provided for interconnection to the Fiber Driver Boards 96. In the preferred embodiment, a total of four Fiber Driver Boards 96, one for each of the left brain primary loop 91, the right brain primary loop 92, the left brain secondary loop 93, and the right brain secondary loop 94, are utilized. Card Guides 334 and 336 are provided with each of the Connectors 320, 322, 324, 326. The Card Guides 334, 336 are oriented to receive the edge of the mounted Fiber Driver Board 96 at points 338 and 340, respectively (shown in FIG. 22).

Figure 24:
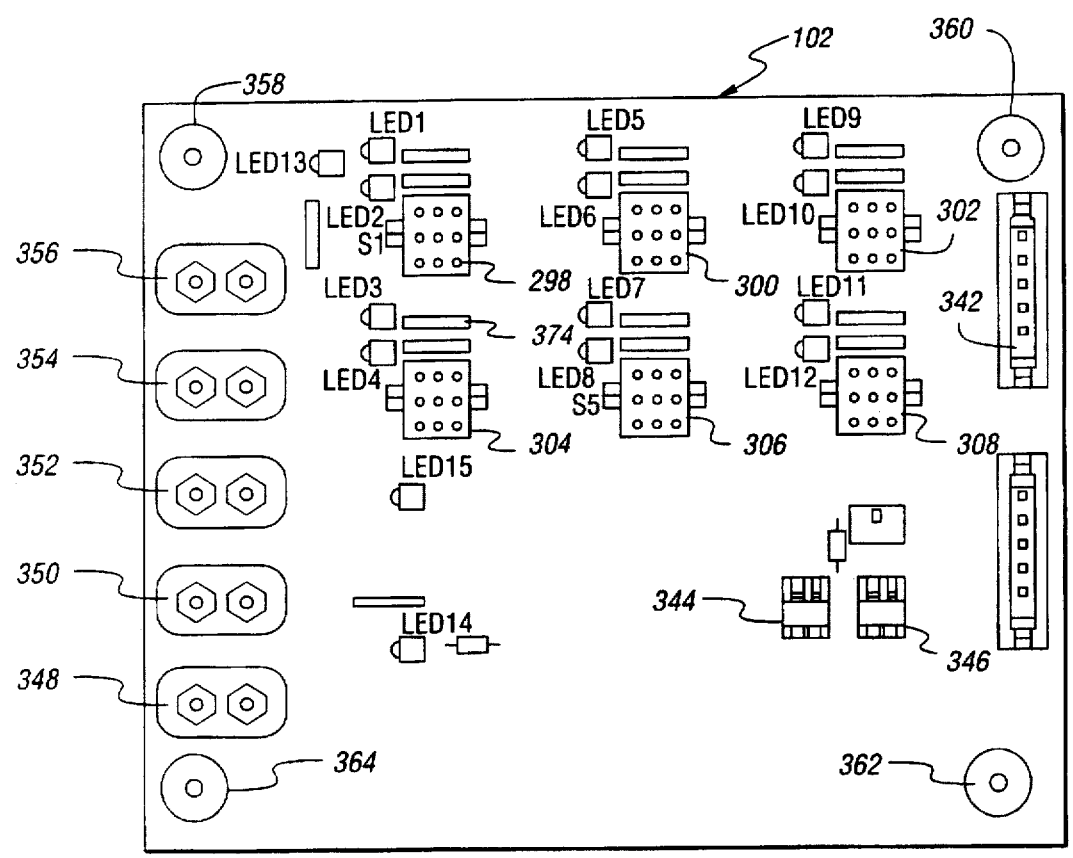
FIG. 24 is a diagram of the Power Distribution Board utilized in the system of the present invention.

FIG. 24 illustrates the components on the Power Distribution Board 102. Connector 342 provides a power supply to connector 252 on the Backplane Board 88 to provide power to the Processor Boards 82, 84 and the Memory Backup Board 86. Each of the six 9-pin connectors 298, 300, 302, 304, 306, 308 are provided to interconnect power with the six Bulb Driver Boards 98 and 100. Each of screw terminals 344 and 346 are provided for power supply monitoring input and output, respectively.

Each of dual screw terminals 348, 350, 352, 354, 356 accommodate wire inputs, with terminals 356 and throughholes 358, 360, 362, 364 connected to ground. Connectors 350 and 356 are not used. Terminals 352 and 354 are connected to points 368 or 370 on the Power Diode Assembly 372 (shown in FIG. 25). For convenient maintenance, an LED is provided for each of the Fuses 374 on Power Distribution Board 102. The LEDs cease glowing when the associated fuse is blown.

Figure 25:
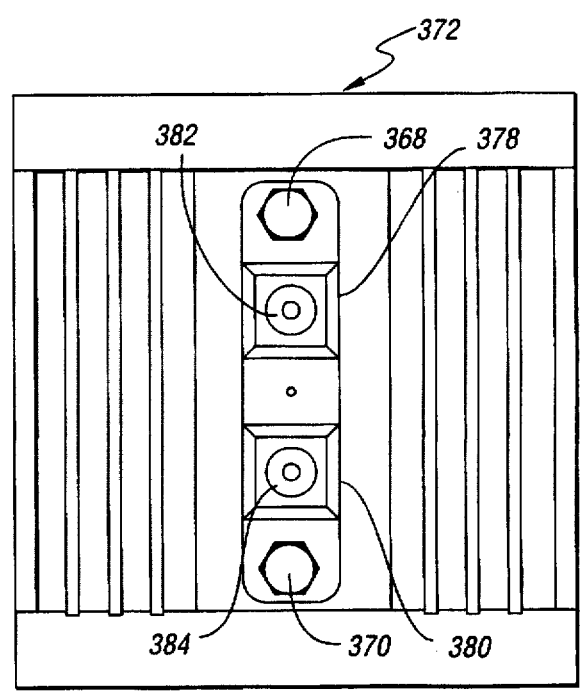
FIG. 25 is a diagram of the Power Diode Assembly utilized in the system of the present invention.

Referring now to FIG. 25, a Power Diode Assembly 372 is preferably provided as protection for the back-up power system. In the preferred embodiment, each panel is powered by a 5 volt DC power supply 376 (shown in FIG. 3) and backed-up by the 5 volt DC power supply from another panel. The Power Diode Assembly 372 provides two 100 amp, 35 volt Schottky barrier rectifiers 378 and 380, available as part no. 357B-01 from Motorola Corp., which provide power isolation for the system. Connectors 382 and 384 are connected to the principal power supply 376 (for example in panel 46) and the back-up power supply (from, for example, the power supply from panel 44).

Figure 26:
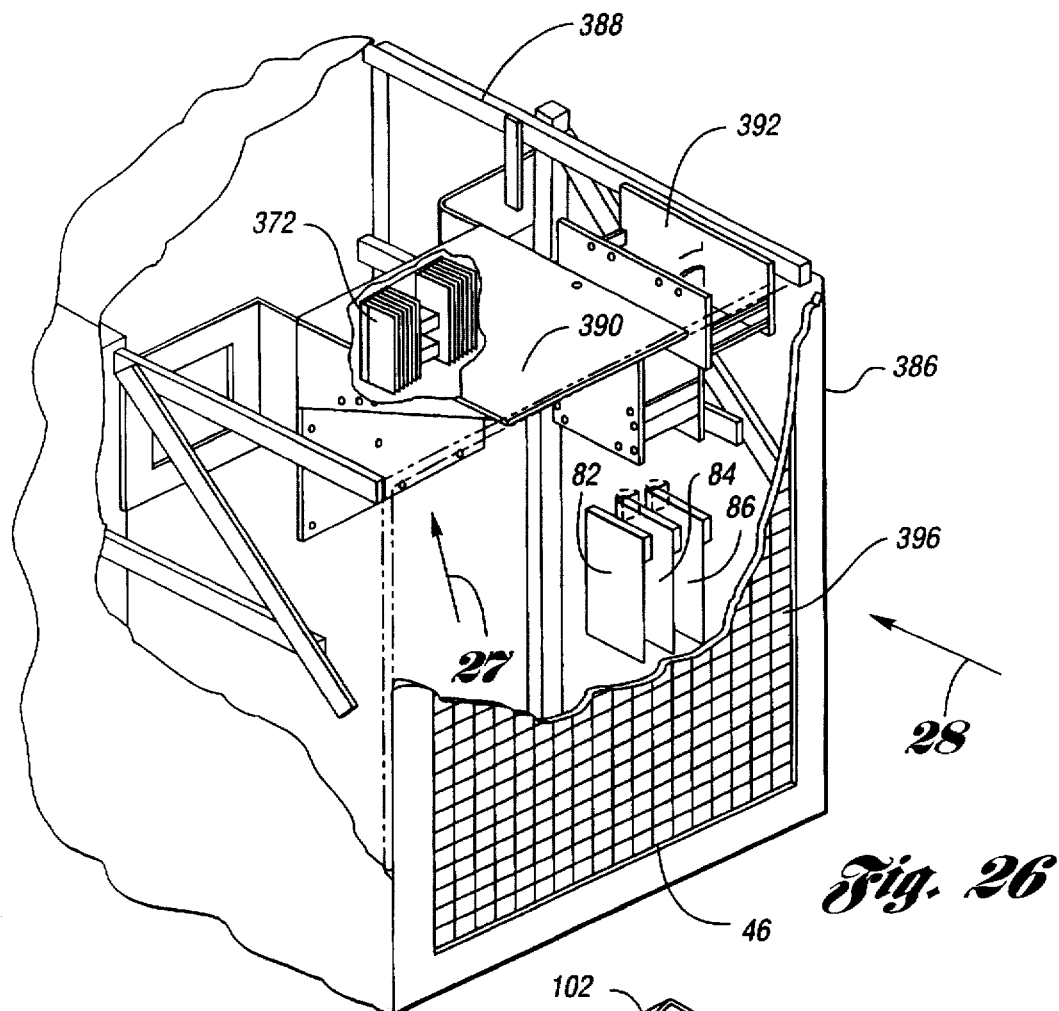
FIG. 26 is a partial perspective view of the card cage for the cards utilized in a cabinet-mounted panel.

Referring now to FIG. 26, the components of the graphic panel data processors and their associated panels are preferably mounted within a cabinet 386. The cabinet 386 may also house input/output (I/O) hardware connecting the instruments and equipment utilized in the manufacturing process controlled by the PCS utilizing the system of the present invention, as well as the computer hardware which comprises the PCS 62. In the preferred embodiment, a single PCS 62 (consisting of a redundant processing architecture having virtually independent "left brain" and "right brain" processors) is mounted within one of the cabinets 386 along with a portion of the I/O hardware and the GPDP 50, communications means 56, and other hardware associated with the light panel 46. Up to nine other cabinets may be utilized by the PCS 62, with these cabinets each containing I/O hardware, another GPDP, communications means and other hardware associated with that panel. Each of the GPDP's in each cabinet is interconnected to the other, and to the PCS 62, via the data communication ring 64. Cabinet 386 may be constructed of sheet metal, plastic or any material suitable for housing electronic and electrical components, and typically includes a rigid metal framework 388 defining the cabinet's shape and structure. Metal or plastic brackets are then mounted on the framework 388 within the cabinet 386 with sheet metal screws or other conventional fasteners to hold and house the various electrical and electronic components in the cabinet 386.

Figure 27:
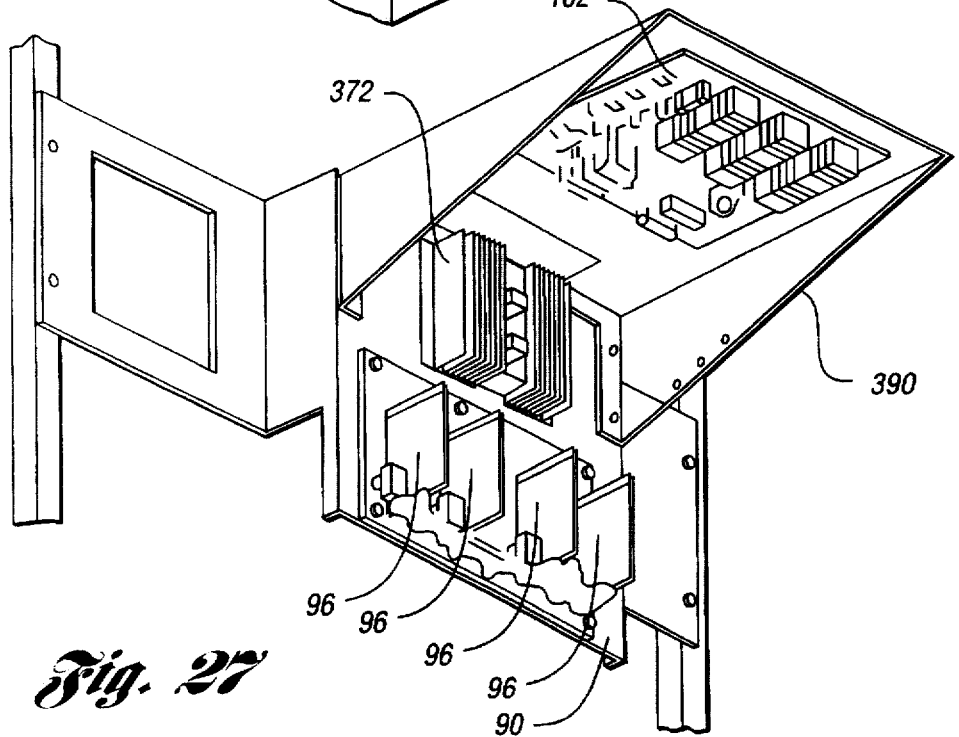
FIG. 27 is a partial perspective view of the mounting bracket for the Fiber Mount Board and Power Distribution Board utilized in the cabinet-mounted panel.
Figure 28:
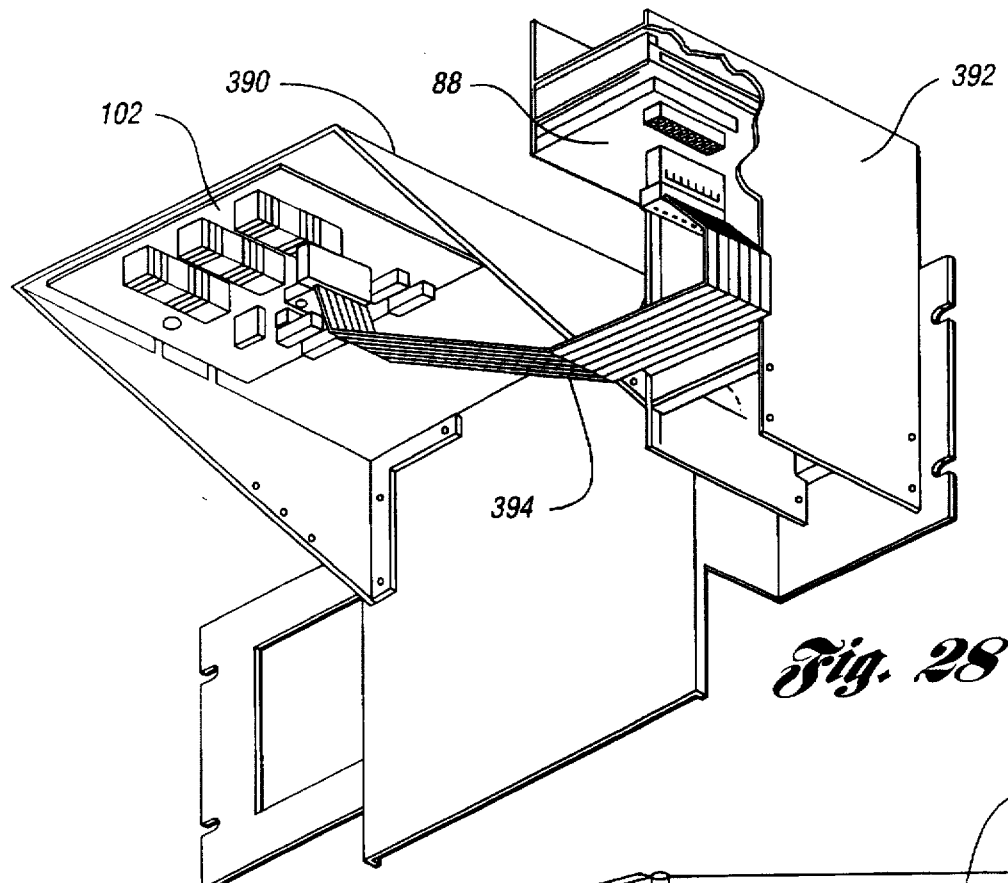
FIG. 28 is a partial perspective view of the card mounting cages showing the power cable connection between the Power Distribution Board and the Backplane Board utilized in the cabinet-mounted panel.

Referring to FIGS. 26, 27 and 28, in the preferred embodiment of the present invention, a first mounting bracket 390 is bolted within the cabinet 386 for mounting the Power Distribution Board 102 (shown in FIG. 28), the diode assembly 372 and the Fiber Mount Board 90 and each of the Fiber Driver Boards 96.

Referring to FIGS. 26 and 28, a second mounting bracket 392 is preferably mounted to the framework 388 adjacent the first mounting bracket 390. The Backplane Board 88 is mounted on the second mounting bracket 392, and each of the Processor Boards 82, 84 and the Memory Backup Board 86 are then snap-fit connected onto the Backplane Board 88. Each of the boards is interconnected as required (as previously described herein) including the six-conductor power cable 394 which supplies power to the Backplane Board 88 and connected Processor Boards 82, 84 and Memory Backup Board 86 from the Power Distribution Board 102.

Referring again to FIG. 26, each of the Bulb Driver Boards 98 and 100 are mounted on the inside face of the panel 46 to form the grid upon which the bulbs 48 are mounted. In the preferred embodiment, a rectangular aluminum framework grid 396 is mounted on the front of the cabinet, with each of the rectangular openings defining a bulb mount location. A transparent or translucent plastic sheet may be placed over the grid to protect the inside of the cabinet from dust. Mylar overlays highlighting or identifying certain bulb locations may be placed over the grid if desired. The overlays may be tinted selected colors at various locations to further distinguish between, for example, classes of variables. Alternatively, selected ones of the lightbulbs themselves may be covered with colored sleeves so that they glow in selected colors to designate, for example, certain classes of variables.

Figure 29:
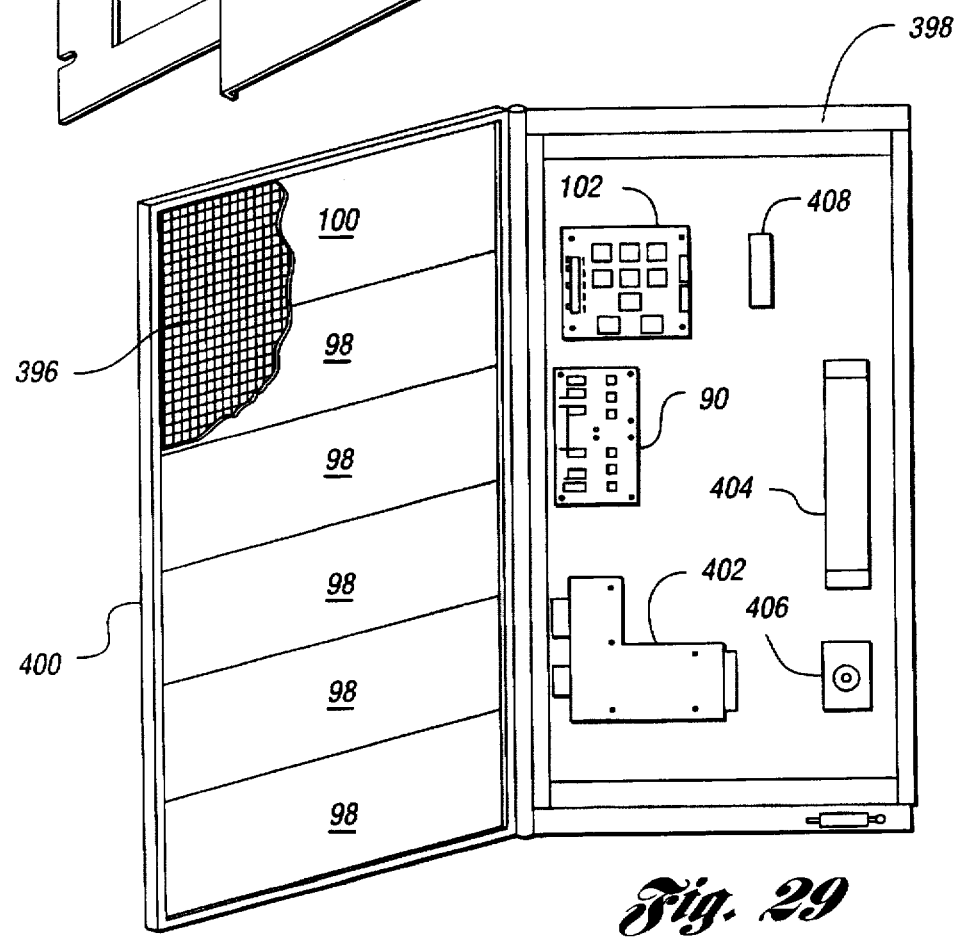
FIG. 29 is a diagram showing the board installation for an alternative wall-mounted panel.

Referring now to FIG. 29, an alternative embodiment of the present invention employs a wall-mounted cabinet 398 for housing one of the panels of the present invention. This cabinet is preferably about 11 inches thick, and may be mounted on a wall much like a large picture frame. As will be appreciated by those skilled in the art, this wall-mount embodiment allows for the remaining PCS hardware and cabinets to be located remotely from an operator's room which might contain several wall-mounted panels as well as other operator station equipment associated with the manufacturing process control system. Each of the Bulb Driver Boards 98 and 100 is mounted on the inside face of the light panel door 400, which, as with the other embodiment, preferably includes a rectangular metal framework 396 defining the bulb grid. The bulb Decoder Boards 104 (not shown) are snap-mounted onto the Bulb Driver Boards on the swinging door 400. The inside of the cabinet 398 provides more than ample space for mounting the Power Distribution Board 102, the Fiber Mount Board 90 (and associated Fiber Driver Boards 96, not shown), as well as the mounting bracket 402 for the Backplane Board 88, Memory Backup Board 86, and Processor Boards 82, 84. A 110–220 volt AC to 5 volt DC power supply 404, AC outlet 406 for the power supply, and a terminal strip 408 for connecting back-up power and current sensing lines are also provided in the alternative wall-mount embodiment.

Figure 30:
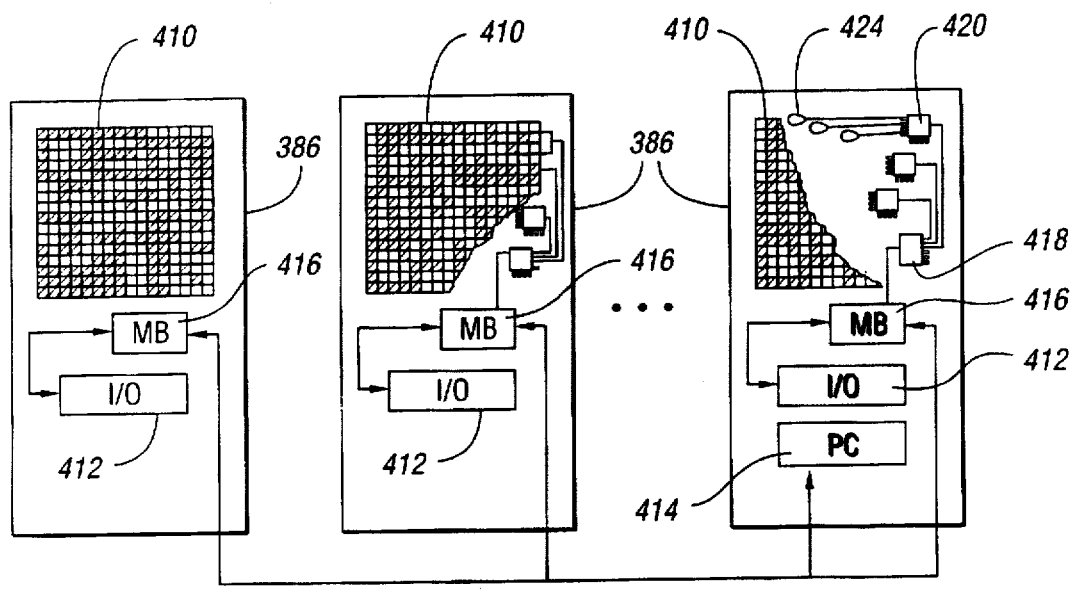
FIG. 30 is a schematic representation of another alternative embodiment graphics display system utilized with a manufacturing process control computer.

Referring to FIG. 30, an alternative embodiment of a graphic display system is shown. Each of the one or more panels 410, including an array of up to 1530 light bulbs, is mounted within a cabinet (or can), 386 which cabinet also includes up to 100 digital and 100 analog inputs and outputs 412 relating to the process equipment and instrumentation on the plant floor, as well as process control variables, alarms and flags. The inputs and outputs 412 from each can 386 are hardwired to a process control system (PCS) 414 (which may or may not be physically located in one of the cans 386) via the Mother Board 416. The PCS periodically determines the desired status of each of the lights on each of the panels 410 based upon the current status of the associated input, output, variable, or flag, and transmits an enable signal and the appropriate address. The output of the PCS 414 is hardwire connected to each of the bulbs 418 on each of the panels 410 via a series of multiplexers. The first multiplexer is located on the Mother Board 416 of the can 386. The PCS 414, transmits the enable signal to each of Mother Boards 416 in each can 386. If, for example, the can containing multiplexer 418 is addressed, multiplexer 418 then transmits the enable signal to one of the bulb cards 420 to which it is hardwired. The appropriate bulb card 420 then lights the bulb corresponding to the selected address. Thus, the Mother Board and multiplexer 418 in each can 386 transmits enable signals, via bulb multiplexers 420, to one, and only one, bulb on its panel 410 to turn the bulb on or off as required.

Figure 31:
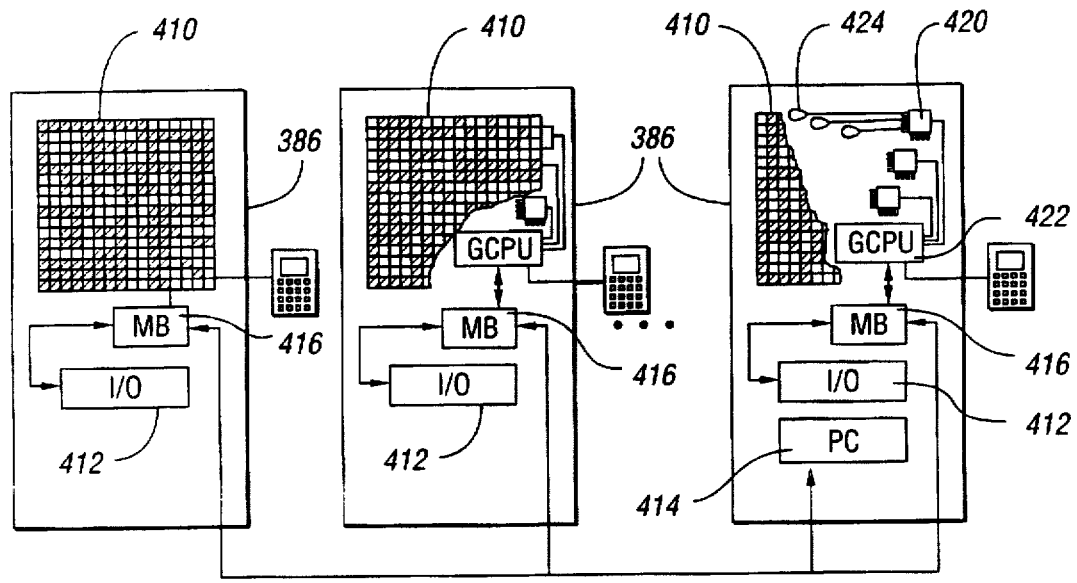
FIG. 31 is a schematic representation of another alternative embodiment graphics display system utilized with a manufacturing process control computer.

In another embodiment, shown in FIG. 31, a Graphics CPU (GCPU) 422 is mounted in each cabinet 386. The Graphics CPU 422 receives the enable signal and address from the Mother Board 416 via the hardwire connection to the PCS 414. In this embodiment, the GCPU 422 may be programmed to assign a location in the light array to a selected one of the inputs or outputs 412 which are wired into that particular can 386. One advantage of the system of FIG. 31 is, as with the preferred embodiment of FIGS. 1–29, the GCPU 422 can map any of the inputs/outputs from the cabinet 386 to any of the bulbs in that cabinet. This allows for the panel to be fully populated with bulbs. A selected variable may then be mapped to any one desired location on the fully populated panel 410 by the GCPU 422 without changing the hardwire connections or physically moving the bulbs on the panel.

While the best mode and alternate modes for carrying out the invention have been described in detail, those familiar with the art to which this invention relates will recognize various alternative designs and embodiments for practicing the invention as disclosed by the following claims.

What is claimed:

1. In a manufacturing process control system including a process control computer, a programmable graphics display system for displaying information corresponding to selected process variables from the process control computer, the graphics display system comprising:

a plurality of graphics display panels, each panel including, an array of lights, a graphic panel data processor comprising at least two independent processors, each processor including,
a microprocessor,
first logic executable by the microprocessor for establishing a correspondence between selected process variables and at least one of the lights in the array,
second logic executable by the microprocessor for determining, for each light in the array, the current state of a corresponding process variable,
third logic executable by the microprocessor for generating a signal for transmission to the light to activate or deactivate the light as a function of the current state of the corresponding process variable, interprocessor communication means interconnecting the independent processors, fourth logic executable by each microprocessor for determining which one of the processors is transmitting the signals to the panel to activate or deactivate each light as a function of the current state of the corresponding process variables, and fifth logic executable by each microprocessor for communicating on the interprocessor communication means a control signal between the microprocessors indicating which processor is currently transmitting the signals to the light panel;

storage memory operably connected to each of the independent processors; and communication means interconnecting each of the graphic display panels and the process control computer, the communication means comprising,
a first communication ring establishing a primary communication path interconnecting one of the independent processors on each of the display panels with the process control computer, means for transmitting selected process control variable data from the process control computer in a first direction, a second communication ring establishing a primary communication path interconnecting another one of the independent processors on each of the display panels with the process control computer, for transmitting selected process control variable data from the process control computer in a first direction independently of the first communication ring.

2. The display system of claim 1 wherein there are two independent processors in the graphic panel data processor and further including:

a third communication ring establishing a secondary communication path interconnecting one of the independent processors on each of the display panels with the process control computer, means for transmitting selected process control variable data from the process control computer in the opposite direction to the first direction of transmission on the first communication ring, and a fourth communication ring establishing a secondary communication path interconnecting the other one of the independent processors on each of the display panels with the process control computer, for transmitting selected process control variable data from the process control computer in the opposite direction to the first direction of transmission on the second communication ring.

3. The display system of claim 1 wherein the communication means include at least one optical fiber serial communication ring.

4. The display system of claim 1 further including data input means connected to at least one display panel for inputting data to the graphics panel data processor including the correspondence between selected process variables and at least one of the lights.

5. The display system of claim 4 wherein at least one display panel further includes sixth logic executable by at least one of the microprocessors for reassigning the process variable-to-light correspondence on the display panel in response to preselected commands input on the data input means.

6. The display system of claim 1 wherein at least one display panel further includes diagnostic logic for determining the location of each light corresponding to a specified variable and transmitting a signal to each light to activate the light, thereby indicating which lights on the panel have been programmed to correspond to which variables.

7. The display system of claim 1 wherein at least one display panel further includes diagnostic logic for interrogating each of the lights on the panel, determining whether the lights inoperative, and for each light that is inoperative, transmitting a signal to activate each light in the row and column of the inoperative light, thereby illuminating a crosshair pattern intersecting at the location of the inoperative light and facilitating quick identification and replacement of the inoperative light.

* * * * *